US012183263B2

(12) United States Patent
Tian

(10) Patent No.: US 12,183,263 B2
(45) Date of Patent: Dec. 31, 2024

(54) DISPLAY CONTROL APPARATUS, DISPLAY APPARATUS, AND ELECTRONIC DEVICE

(71) Applicant: Honor Device Co., Ltd., Shenzhen (CN)

(72) Inventor: Zheng Tian, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/043,788

(22) PCT Filed: Mar. 31, 2022

(86) PCT No.: PCT/CN2022/084390

§ 371 (c)(1),
(2) Date: Mar. 2, 2023

(87) PCT Pub. No.: WO2023/273466

PCT Pub. Date: Jan. 5, 2023

(65) Prior Publication Data

US 2024/0021142 A1 Jan. 18, 2024

(30) Foreign Application Priority Data

Jun. 30, 2021 (CN) ......................... 202110736225.3

(51) Int. Cl.
*G09G 3/32* (2016.01)

(52) U.S. Cl.
CPC ......... *G09G 3/32* (2013.01); *G09G 2300/043* (2013.01); *G09G 2300/0819* (2013.01);
(Continued)

(58) Field of Classification Search
CPC ...... G09G 3/32–3291; G09G 2300/0421–043; G09G 2300/0809;
(Continued)

(56) References Cited

U.S. PATENT DOCUMENTS 3,743,772 A 7/1973 Pieters et al.
10,417,967 B2 9/2019 Zhu et al.
(Continued)

FOREIGN PATENT DOCUMENTS

CN 107358916 A 11/2017
CN 109584808 A 4/2019
(Continued)

*Primary Examiner* — Nathan Danielsen
(74) *Attorney, Agent, or Firm* — Rimon PC

(57) ABSTRACT

This application discloses a display control apparatus, a display apparatus, and an electronic device, relates to the field of electronic circuit technologies. A specific solution is as follows. An adjustment unit in the display control apparatus outputs an adjustment voltage in a write frame to a control-end back channel of a drive thin-film transistor in a light-emitting drive unit, so that the influence of negative bias of a threshold voltage of the drive thin-film transistor caused by a negative voltage of a first reset voltage, and therefore a transfer characteristic curve of the drive thin-film transistor shifts forward in the write frame, that is, the threshold voltage of the drive thin-film transistor shifts forward, making it easier for the drive thin-film transistor to turn on in the write frame, and increasing the brightness of the drive thin-film transistor in the write frame.

17 Claims, 10 Drawing Sheets

(52) U.S. Cl.
CPC ............... *G09G 2310/0251* (2013.01); *G09G 2310/027* (2013.01); *G09G 2310/0289* (2013.01); *G09G 2320/0247* (2013.01)

(58) Field of Classification Search
CPC ... G09G 2300/0819; G09G 2300/0861; G09G 2310/0243; G09G 2310/0251; G09G 2310/0264; G09G 2310/027; G09G 2310/0289; G09G 2310/06–063; G09G 2310/08; G09G 2320/0223; G09G 2320/0233; G09G 2320/0242; G09G 2320/0247; G09G 2320/04
See application file for complete search history.

(56) References Cited

U.S. PATENT DOCUMENTS

| | | | | |
|---|---|---|---|---|
| 10,872,573 | B2 | 12/2020 | Li | |
| 10,916,197 | B1 * | 2/2021 | Zhang | G09G 3/3258 |
| 11,211,010 | B2 | 12/2021 | Yuan | |
| 11,282,461 | B2 | 3/2022 | Li et al. | |
| 11,450,275 | B2 | 9/2022 | Li et al. | |
| 11,682,353 | B2 | 6/2023 | Yoon et al. | |
| 11,688,348 | B2 | 6/2023 | Wang et al. | |
| 2018/0130418 | A1 | 5/2018 | Zhu et al. | |
| 2019/0221165 | A1 * | 7/2019 | Park | G09G 3/3233 |
| 2020/0013345 | A1 * | 1/2020 | Jeong | G09G 3/3233 |
| 2020/0243017 | A1 | 7/2020 | Lee | |
| 2020/0312230 | A1 | 10/2020 | Bae | |
| 2020/0320933 | A1 * | 10/2020 | Zhou | G09G 3/3233 |
| 2021/0049958 | A1 | 2/2021 | Kim et al. | |
| 2021/0104196 | A1 | 4/2021 | Yuan et al. | |
| 2021/0272521 | A1 * | 9/2021 | Yoon | G09G 3/3233 |
| 2021/0343238 | A1 | 11/2021 | Okabe et al. | |

FOREIGN PATENT DOCUMENTS

| | | | |
|---|---|---|---|
| CN | 111508426 | A | 8/2020 |
| CN | 112102785 | A | 12/2020 |
| CN | 112116897 | A | 12/2020 |
| CN | 112771603 | A | 5/2021 |
| CN | 112992026 | A | 6/2021 |
| EP | 3813053 | A1 | 4/2021 |
| GB | 1334044 | A | 10/1973 |
| IN | 111710299 | A | 9/2020 |
| JP | H07107458 | A | 4/1995 |
| JP | 2006227237 | A | 8/2006 |

* cited by examiner

DISPLAY CONTROL APPARATUS, DISPLAY APPARATUS, AND ELECTRONIC DEVICE

CROSS-REFERENCE TO RELATED APPLICATIONS

This application is a national stage of International Application No. PCT/CN2022/084390, filed on Mar. 31, 2022, which claims priority to Chinese Patent Application No. 202110736225.3, filed on Jun. 30, 2021. The disclosures of both of the aforementioned applications are hereby incorporated by reference in their entireties.

TECHNICAL FIELD

This application relates to the field of data processing technologies, and in particular, to a display control apparatus, a display apparatus, and an electronic device.

BACKGROUND

In the related art, many display apparatuses can be driven at low frequencies. Specifically, when a display apparatus is driven at a low frequency, a data voltage will be written in a write frame, and the written data voltage will be maintained in a hold frame, so as to achieve low power consumption of the display apparatus.

However, in the existing display apparatus, as a drive thin-film transistor in the display apparatus will be affected in a write frame by a negative voltage applied during reset, a bias state of the drive thin-film transistor in the write frame is different from a bias state of the drive thin-film transistor in a hold frame, and consequently a threshold voltage of the drive thin-film transistor in the write frame is negatively biased compared to a threshold voltage of the drive thin-film transistor in the hold frame. As a result, a brightness of the display apparatus in the write frame is lower than a brightness of the display apparatus in the hold frame, and the display apparatus flickers in a low-frequency driving mode.

SUMMARY

This application provides a display control apparatus, a display apparatus, and an electronic device, and aims to resolve the problem of flickering of the display apparatus in a low-frequency driving mode.

To achieve the foregoing objective, this application provides the following technical solutions.

According to a first aspect, this application provides a display control apparatus, including a first reset unit configured to output a first reset voltage, a write unit configured to output a data voltage, and a light-emitting drive unit connecting the first reset unit and the write unit, wherein the light-emitting drive unit is configured to output a first drive power supply voltage to a light-emitting device through the first reset voltage, an adjustment voltage, and the data voltage; and the display control apparatus further including an adjustment unit. The adjustment unit is connected to the light-emitting drive unit, and outputs the adjustment voltage in a write frame to a control-end back channel of a drive thin-film transistor in the light-emitting drive unit. The adjustment voltage is a positive voltage, and the first reset voltage is a negative voltage.

In the display control apparatus of this application, an adjustment unit connected to a light-emitting drive unit outputs an adjustment voltage in a write frame to a control-end back channel of a drive thin-film transistor in the light-emitting drive unit, so that the influence of negative bias of a threshold voltage of the drive thin-film transistor caused by a negative voltage of a first reset voltage, and therefore a transfer characteristic curve of the drive thin-film transistor shifts forward in the write frame, that is, the threshold voltage of the drive thin-film transistor shifts forward, making it easier for the drive thin-film transistor to turn on in the write frame, and increasing the brightness of the drive thin-film transistor in the write frame. As a result, the light-emitting drive unit controls the light-emitting brightness of a light-emitting device in the write frame and a hold frame to avoid deviation, thereby preventing flickering.

In a possible implementation, the adjustment unit includes: a first transistor. A control end of the first transistor receives a first control signal, an input end of the first transistor receives the adjustment voltage, an output end of the first transistor is connected to the control-end back channel of the drive thin-film transistor in the light-emitting drive unit. The first control signal controls the first transistor to be turned on in the write frame, so that the output end of the first transistor can output the adjustment voltage to the control-end back channel of the drive thin-film transistor.

In another possible implementation, a value of the adjustment voltage may be set based on a target gray scale. The target gray scale is an actually required gray scale of the light-emitting device. The gray scale of the light-emitting device can satisfy actual needs by setting the value of the adjustment voltage.

In another possible implementation, in the case of outputting a reset voltage, the first reset unit is configured to output the first reset voltage in the write frame to a control end of the drive thin-film transistor, so as to reset the drive thin-film transistor.

In another possible implementation, in the case of outputting the first drive power supply voltage to the light-emitting device through the first reset voltage, the adjustment voltage, and the data voltage, the light-emitting drive unit is configured to: in the write frame, reset the drive thin-film transistor through the first reset voltage received, increase a threshold voltage of the drive thin-film transistor through the adjustment voltage received, write the data voltage received to a control end of the drive thin-film transistor, and compensate the threshold voltage of the drive thin-film transistor to the control end of the drive thin-film transistor, so as to output the first drive power supply voltage to the light-emitting device; and in a hold frame, maintain an electric potential of the control end of the drive thin-film transistor at a fixed voltage value through the data voltage received by an input end of the drive thin-film transistor, so as to output the first drive power supply voltage to the light-emitting device. The fixed voltage value is a sum of the threshold voltage of the drive thin-film transistor and the data voltage.

In the display control apparatus of this application, the threshold voltage of the drive thin-film transistor can be prevented from being fixed into a negative bias state at the beginning of the write frame through the data voltage received by the input end of the drive thin-film transistor in the hold frame.

In another possible implementation, in the case of outputting the data voltage, the write unit is configured to output the data voltage according to a first preset frequency in the write frame and a hold frame.

In another possible implementation, the display control apparatus further includes: a second reset unit, configured to output a second reset voltage to the light-emitting device according to a second preset frequency in a non-light-emitting period of time of the light-emitting device in the write frame and a hold frame, so as to reset the light-emitting device.

In another possible implementation, the first reset unit includes: a second transistor, where a control end of the second transistor receives a second control signal, an input end of the second transistor receives the first reset voltage, an output end of the second transistor is connected to a control end of the drive thin-film transistor in the light-emitting drive unit. The second control signal controls the second transistor to be turned on in the write frame. After the second transistor is turned on, the output end of the second transistor outputs the first reset voltage to the control end of the drive thin-film transistor, so as to reset the drive thin-film transistor.

In another possible implementation, the light-emitting drive unit includes: a third transistor, a fourth transistor, a fifth transistor, a capacitor, and the drive thin-film transistor. A control end of the third transistor receives a third control signal, an input end of the third transistor is connected to an output end of the drive thin-film transistor, and an output end of the third transistor is connected to a control end of the drive thin-film transistor. The third control signal controls the third transistor to be turned on in the write frame. A control end of the fourth transistor receives a fourth control signal, an input end of the fourth transistor receives the first drive power supply voltage, and an output end of the fourth transistor is connected to an input end of the drive thin-film transistor. The input end of the drive thin-film transistor further receives the data voltage outputted by the write unit. A control end of the fifth transistor receives the fourth control signal, an input end of the fifth transistor is connected to the output end of the drive thin-film transistor, and an output end of the fifth transistor is connected to the light-emitting device. The output end of the fifth transistor outputs the first drive power supply voltage in a case that the fifth transistor is turned on. The fourth control signal controls the fourth transistor and the fifth transistor to be turned on in a light-emitting period of time of the light-emitting device in the write frame and a hold frame. One end of the capacitor is connected to the control end of the drive thin-film transistor, and the other end of the capacitor is connected to the input end of the fourth transistor.

In another possible implementation, the write unit includes: a sixth transistor. A control end of the sixth transistor receives a fifth control signal, an input end of the sixth transistor receives the data voltage, the sixth transistor outputs the data voltage. The fifth control signal controls the sixth transistor to be turned on according to a first preset frequency in the write frame and a hold frame.

In another possible implementation, the second reset unit includes: a seventh transistor. A control end of the seventh transistor receives a sixth control signal, an input end of the seventh transistor receives the second reset voltage, an output end of the seventh transistor outputs the second reset voltage. The sixth control signal controls the seventh transistor to be turned on according to the second preset frequency in the non-light-emitting period of time of the light-emitting device in the write frame and the hold frame.

According to a second aspect, this application provides a display apparatus, including the display control apparatus according to the first aspect or any one of the possible implementations of the first aspect, and a light-emitting device connected to the display control apparatus. The light-emitting device is configured to emit light in a case that the first drive power supply voltage is received.

In the display apparatus of this application, an adjustment unit connected to a light-emitting drive unit outputs an adjustment voltage in a write frame to a control-end back channel of a drive thin-film transistor in the light-emitting drive unit, so that the influence of negative bias of a threshold voltage of the drive thin-film transistor caused by a negative voltage of a first reset voltage, and therefore a transfer characteristic curve of the drive thin-film transistor shifts forward in the write frame, that is, the threshold voltage of the drive thin-film transistor shifts forward, making it easier for the drive thin-film transistor to turn on in the write frame, and increasing the brightness of the drive thin-film transistor in the write frame. As a result, the light-emitting drive unit controls the light-emitting brightness of a light-emitting device in the write frame and a hold frame to avoid deviation, thereby preventing flickering.

In a possible implementation, a control chip, connected to the display control apparatus and the light-emitting device respectively, is configured to generate a first reset voltage, the first drive power supply voltage, a first control signal, and an adjustment voltage.

In another possible implementation, the light-emitting device is a light-emitting diode, where a cathode of the light-emitting diode receives a second drive power supply voltage, and an anode of the light-emitting diode receives the first drive power supply voltage.

According to a third aspect, this application provides an electronic device, including: a display screen, provided with the display apparatus according to the second aspect or any one of the possible implementations of the second aspect.

In the electronic device of this application, an adjustment unit connected to a light-emitting drive unit outputs an adjustment voltage in a write frame to a control-end back channel of a drive thin-film transistor in the light-emitting drive unit, so that the influence of negative bias of a threshold voltage of the drive thin-film transistor caused by a negative voltage of a first reset voltage, and therefore a transfer characteristic curve of the drive thin-film transistor shifts forward in the write frame, that is, the threshold voltage of the drive thin-film transistor shifts forward, making it easier for the drive thin-film transistor to turn on in the write frame, and increasing the brightness of the drive thin-film transistor in the write frame. As a result, the light-emitting drive unit controls the light-emitting brightness of a light-emitting device in the write frame and a hold frame to avoid deviation, thereby preventing the display screen from flickering.

In a possible implementation, the first preset frequency is consistent with a screen refresh rate of the display screen.

In another possible implementation, the second preset frequency is consistent with a screen refresh rate of the display screen.

DESCRIPTION OF EMBODIMENTS

Figure 1:
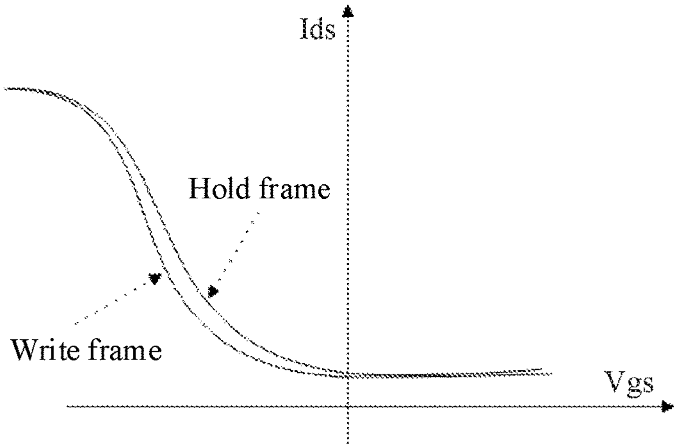
FIG. 1 is a transfer characteristic curve of a drive thin-film transistor in a display apparatus in a write frame and a hold frame.

In the specification, claims, and accompanying drawings of this application, the terms "first", "second", "third", and so on are intended to distinguish different objects but do not indicate a particular order.

In the embodiments of this application, the word "exemplary" or "for example" is used to represent giving an example, an illustration, or a description. Any embodiment or design scheme described by using "exemplary" or "for example" in the embodiments of this application should not be explained as being more preferred or having more advantages than other embodiments or design schemes. In particular, the terms such as "exemplary" or "for example" as used herein are intended to present the related concept in a specific implementation.

For a clear and concise description of the following embodiments, brief introductions of an implementation of a display apparatus are presented first.

The display apparatus has a normal driving mode and a low-frequency driving mode. In the normal driving mode, the display apparatus writes a data voltage in each frame. In the low-frequency driving mode, a data voltage is written to a control end of a drive thin-film transistor only in a write frame, and in the following several hold frames, the drive thin-film transistor (drive thin-film transistor, DTFT) controls a light-emitting device to emit light by maintaining the data voltage of the control end in the write frame. The drive thin-film transistor DTFT refers to a thin-film transistor that provides a drive current for the light-emitting device.

Although the display apparatus has a low power consumption in the low-frequency driving mode, the display apparatus has a brightness in the write frame lower than a brightness in the hold frame in the low-frequency driving mode, that is, the display apparatus will flicker. Specifically, in a reset phase of the write frame, the display apparatus first inputs a first reset voltage to the control end of the P-type drive thin-film transistor, to reset the drive thin-film transistor. The first reset voltage is a negative voltage. After the drive thin-film transistor is reset, the display apparatus writes a data voltage to the control end of the drive thin-film transistor, and in a subsequent hold frame, the control end of the drive thin-film transistor maintains an electric potential of the written data voltage. The data voltage is a positive voltage. In the write frame, the control end of the drive thin-film transistor is affected by the first reset voltage in the reset phase. The control end of the drive thin-film transistor is not affected by the first reset voltage in the hold frame, so the electric potential of the control end is maintained as the electric potential of the data voltage, and therefore a threshold voltage of the control end of the drive thin-film transistor is more negatively biased in the write frame than in the hold frame. The drive thin-film transistor is usually made of low-temperature polycrystalline silicon (Low Temperature Poly-Silicon, LTPS) or indium gallium zinc oxide (indium gallium zinc oxide, IGZO). Using a drive thin-film transistor made of LTPS as an example, when a large negative voltage is applied to the control end, a hole channel of a P channel will be formed. Under an electric field of a gate (namely, the control end), some holes enter a gate insulating layer through a tunneling effect and are captured by a hole acceptor state there. The holes that have not been released cause an effect similar to positive interface charges, so that a transfer characteristic curve of the drive thin-film transistor shifts to a negative value of a gate-source voltage Vgs. That is, when the voltage applied on the control end of the drive thin-film transistor is more negatively biased, the threshold voltage of the drive thin-film transistor is more negatively biased, and the threshold voltage shifts more backward.

Figure 2:
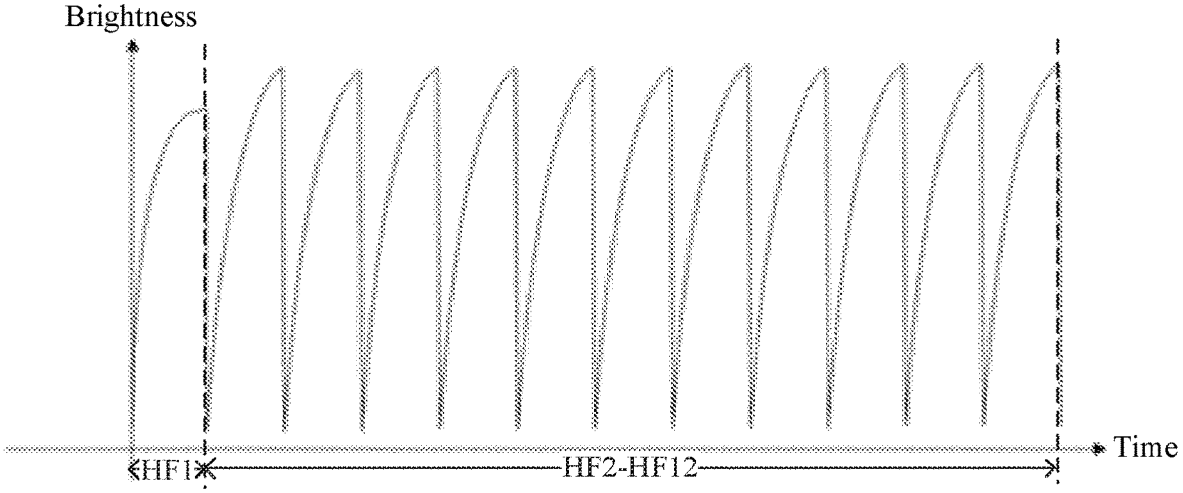
FIG. 2 is a graph showing a change relationship between a brightness of a light-emitting device in a display apparatus and time.

As shown in FIG. 1, FIG. 1 is a transfer characteristic curve of a drive thin-film transistor in a display apparatus in a write frame and a hold frame. Affected by a first reset voltage applied on a control end of the drive thin-film transistor in the write frame, the transfer characteristic curve of the drive thin-film transistor shifts backward compared with that in the hold frame, and a threshold voltage of the drive thin-film transistor is more negatively biased in the write frame than in the hold frame. That is, compared with the hold frame, the drive thin-film transistor needs a larger gate-source voltage Vgs difference in the write frame to be able to turn on (namely, conducting). As the threshold voltage of the drive thin-film transistor is more negatively biased in the write frame than in the hold frame, a turn-on degree of the drive thin-film transistor in a light-emitting period of time of a light-emitting device in the write frame is smaller than a turn-on degree of the drive thin-film transistor in the light-emitting period of time of the light-emitting device in the hold frame. That is, the drive thin-film transistor is in different bias states in the write frame and the hold frame. As a result, a drain-source current Ids of the drive thin-film transistor turned on in the write frame is lower than a drain-source current Ids of the drive thin-film transistor turned on in the hold frame, and a brightness of the light-emitting device connected to the drive thin-film transistor in the write frame is lower than a brightness of the light-emitting device in the hold frame. Specifically, referring to FIG. 2, FIG. 2 is a graph showing a change relationship between a brightness of a light-emitting device and time. It can be seen from FIG. 2 that a brightness of the light-emitting device in a period of time HF1 in a first frame is lower than a brightness of the light-emitting device in a period of time HF2 in a second frame to a period of time HF12 in a twelfth frame. HF1 is the period of time in a write frame, and HF2 to HF12 are the periods of time in hold frames.

Based on the problems existing in the foregoing technical solution, this application provides a display control apparatus and a display apparatus, to resolve the problem of inconsistent brightness of the light-emitting device in the write frame and the hold frame. The provided display control apparatus may be used in an electronic device with a display function, such as a mobile phone, a tablet computer, a desktop computer, a laptop computer, a notebook computer, an ultra-mobile personal computer (Ultra-mobile Personal Computer, UMPC), a handheld computer, a netbook, a personal digital assistant (Personal Digital Assistant, PDA), a wearable electronic device, or a smartwatch. The electronic device in which the display control apparatus and the display apparatus are used may have a structure shown in FIG. 3.

Figure 3:
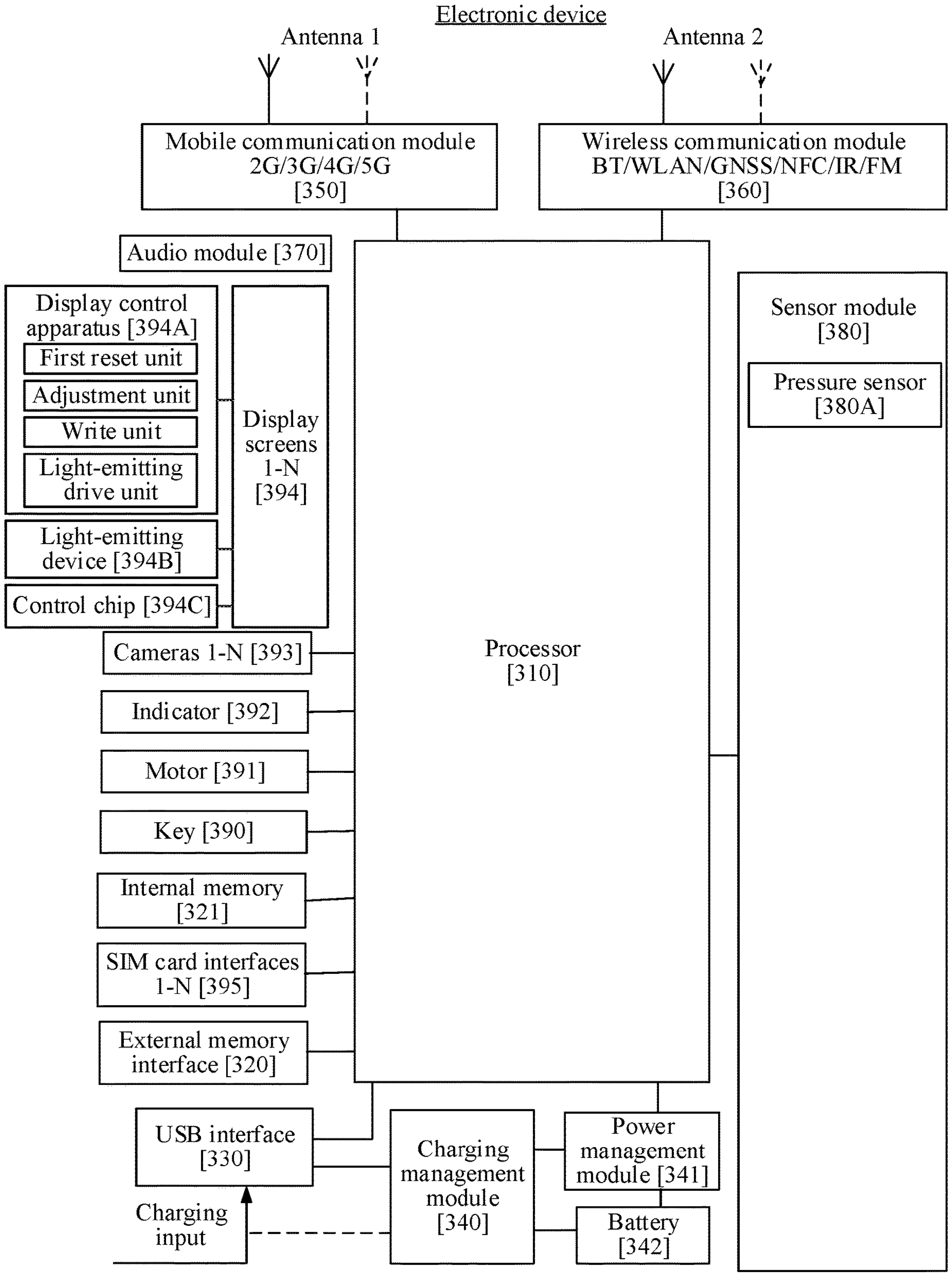
FIG. 3 is a schematic structural diagram of an electronic device according to an embodiment of this application.

As shown in FIG. 3, the electronic device may include a processor 310, an external memory interface 320, an internal memory 321, a universal serial bus (universal serial bus, USB) interface 330, a charging management module 340, a power management module 341, a battery 342, an antenna 1, an antenna 2, a mobile communication module 350, a wireless communication module 360, an audio module 370, a sensor module 380, a key 390, a motor 391, an indicator 392, a camera 393, a display screen 394, a subscriber identification module (subscriber identification module, SIM) card interface 395, and the like. The sensor module 380 may include a pressure sensor 380A and the like.

It may be understood that the schematic structure in this embodiment constitutes no specific limitation on the electronic device. In some other embodiments, the electronic device may include more or fewer components than those shown in the figure, or some components may be combined, or some components may be split, or components are arranged in different manners. The components in the figure may be implemented by hardware, software, or a combination of software and hardware.

The processor 310 may include one or more processing units. For example, the processor 310 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be separate devices, or may be integrated into one or more processors.

The controller may be a nerve center and a command center of the electronic device. The controller may generate an operation control signal according to instruction operation code and a time-sequence signal, and control obtaining and executing of instructions.

A memory may be further configured in the processor 310, to store an instruction and data. In some embodiments, the memory in the processor 310 is a cache. The memory may store an instruction or data that has just been used or cyclically used by the processor 310. If the processor 310 needs to use the instruction or data again, the processor 310 may directly call the instruction or data from the memory, which avoids repeated access, and reduces a waiting time of the processor 310, thereby improving system efficiency.

In some embodiments, the processor 310 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus, including a serial data line (serial data line, SDA) and a serial clock line (derail clock line, SCL). In some embodiments, the processor 310 may include a plurality of sets of I2C buses. The processor 310 may be coupled to a touch sensor 380K, a charger, a flash, the camera 393, and the like through different I2C bus interfaces respectively. For example, the processor 310 may be coupled to the touch sensor 380K through the I2C interface, to enable the processor 310 and the touch sensor 380K to communicate with each other through the I2C bus interface, thereby implementing a touch function of the electronic device.

The I2S interface may be configured to perform audio communication. In some embodiments, the processor 310 may include a plurality of sets of I2S buses. The processor 310 may be coupled to the audio module 370 by the I2S bus to implement communication between the processor 310 and the audio module 370. In some embodiments, the audio module 370 may transmit an audio signal to the wireless communication module 360 through the I2S interface, to implement a function of answering a call through a Bluetooth headset.

The PCM interface may also be configured to perform audio communication, to sample, quantize, and encode an analog signal. In some embodiments, the audio module 370 may be coupled to the wireless communication module 360 through a PCM bus interface. In some embodiments, the audio module 370 may also transmit an audio signal to the wireless communication module 360 through the PCM interface, to implement the function of answering a call through the Bluetooth headset. Both the I2S interface and the PCM interface may be configured to perform audio communication.

The UART interface is a universal serial data bus and is configured to perform asynchronous communication. The bus may be a bidirectional communication bus. The bus converts to-be-transmitted data between serial communication and parallel communication. In some embodiments, the UART interface is usually configured to connect the processor 310 to the wireless communication module 360. For example, the processor 310 communicates with a Bluetooth module in the wireless communication module 360 through the UART interface, to implement a Bluetooth function. In some embodiments, the audio module 370 may transmit an audio signal to the wireless communication module 360 through the UART interface, to implement a function of playing music through the Bluetooth headset.

The MIPI interface may be configured to connect the processor 310 to peripherals such as the display screen 394 and the camera 393. The MIPI interface includes a camera serial interface (camera serial interface, CSI), a display serial interface (display serial interface, DSI), and the like. In some embodiments, the processor 310 communicates with the camera 393 through the CSI interface, to implement a photographing function of the electronic device. The processor 310 communicates with the display screen 394 through the DSI interface, to implement a display function of the electronic device.

The GPIO interface may be configured by software. The GPIO interface may be configured as a control signal or a data signal. In some embodiments, the GPIO interface may be configured to connect the processor 310 to the camera 393, the display screen 394, the wireless communication module 360, the audio module 370, the sensor module 380, and the like. The GPIO interface may alternatively be configured as an I2C interface, an I2S interface, a UART interface, an MIPI interface, or the like.

The USB interface 330 is an interface that conforms to a USB standard specification, and may be specifically a Mini USB interface, a Micro USB interface, a USB Type C interface, or the like. The USB interface 330 may be configured to be connected to the charger to charge the electronic device, or may be configured for data transmission between the electronic device and the peripheral, or may be configured to be connected to a headset to play audio through the headset. The interface may alternatively be configured to be connected to another electronic device such as an AR device.

It can be understood that an interface connection relationship between the modules illustrated in this embodiment is merely an example for description, and does not constitute a limitation on a structure of the electronic device. In some other embodiments of this application, the electronic device may use an interface connection manner different from that in the foregoing embodiment, or may use a combination of a plurality of interface connection manners.

The charging management module 340 is configured to receive a charging input from the charger. The charger may be a wireless charger or may be a wired charger. In some embodiments of wired charging, the charging management module 340 may receive a charging input of the wired charger through the USB interface 330. In some embodiments of wireless charging, the charging management module 340 may receive a wireless charging input by using a wireless charging coil of the electronic device. While the charging management module 340 charges the battery 342, the power management module 341 may also supply power to the electronic device.

The power management module 341 is configured to be connected to the battery 342, the charging management module 340, and the processor 310. The power management module 341 receives an input from the battery 342 and/or the charging management module 340, to supply power to the processor 310, the internal memory 321, the display screen 394, the camera 393, the wireless communication module 360, and the like. The power management module 341 may be further configured to monitor parameters such as a battery capacity, a battery cycle count, and a battery state of health (electric leakage and impedance). In some other embodiments, the power management module 341 may be disposed in the processor 310. In some other embodiments, the power management module 341 and the charging management module 340 may be disposed in a same device.

A wireless communication function of the electronic device may be implemented through the antenna 1, the antenna 2, the mobile communication module 350, the wireless communication module 360, the modem processor, and the baseband processor.

The antenna 1 and the antenna 2 are configured to transmit and receive an electromagnetic wave signal. Each antenna in the electronic device may be configured to cover one or more communication frequency bands. Different antennas may further be multiplexed to improve utilization of the antennas. For example, the antenna 1 may be multiplexed into a diversity antenna of a wireless local area network. In some other embodiments, the antennas may be used with a tuning switch.

The mobile communication module 350 may provide a solution to wireless communication such as 2G/3G/4G/5G applicable to the electronic device. The mobile communication module 350 may include at least one filter, a switch, a power amplifier, a low noise amplifier (low noise amplifier, LNA), and the like. The mobile communication module 350 may receive an electromagnetic wave by the antenna 1, perform processing such as filtering and amplification on the received electromagnetic wave, and send the electromagnetic wave to the modem processor for demodulation. The mobile communication module 350 may further amplify a signal modulated by the modem processor, and convert the signal into an electromagnetic wave through the antenna 1 for radiation. In some embodiments, at least some of functional modules of the mobile communication module 350 may be arranged in the processor 310. In some embodiments, at least some of the functional modules of the mobile communication module 350 and at least some of modules of the processor 310 may be arranged in a same component.

The modem processor may include a modulator and a demodulator. The modulator is configured to modulate a to-be-sent low-frequency baseband signal into a medium/high-frequency signal. The demodulator is configured to demodulate the received electromagnetic wave signal into a low-frequency baseband signal. Then the demodulator transfers the low-frequency baseband signal obtained through demodulation to the baseband processor for processing. The low-frequency baseband signal is processed by the baseband processor and then transmitted to the application processor. The application processor outputs a sound signal through an audio device, or displays an image or a video through the display screen 394. In some embodiments, the modem processor may be an independent device. In some other embodiments, the modem processor may be independent of the processor 310, and the modem processor and the mobile communication module 350 or another functional module may be arranged in a same component.

The wireless communication module 360 may provide a solution to wireless communication applicable to the electronic device, such as a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), and an infrared (infrared, IR) technology. The wireless communication module 360 may be one or more components that integrate at least one communication processing module. The wireless communication module 360 receives an electromagnetic wave through the antenna 2, performs frequency modulation and filtering processing on the electromagnetic wave signal, and sends the processed signal to the processor 310. The wireless communication module 360 may also receive a to-be-sent signal from the processor 310, perform frequency modulation and amplification on the to-be-sent signal, and convert the signal into an electromagnetic wave through the antenna 2 for radiation.

In some embodiments, the antenna 1 and the mobile communication module 350 of the electronic device are coupled, and the antenna 2 and the wireless communication module 360 of the electronic device are coupled, so that the electronic device can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or satellite-based augmentation systems (satellite based augmentation systems, SBAS).

The electronic device implements a display function through the GPU, the display screen 394, the application processor, and the like. The GPU is a microprocessor for image processing, and is connected to the display screen 394 and the application processor. The GPU is configured to perform mathematical and geometric calculation, and is configured to render graphics. The processor 310 may include one or more GPUs, and execute program instructions to generate or change display information.

The display screen 394 is configured to display an image, a video, and the like. The display screen 394 includes a plurality of display control apparatuses 394A and a plurality of light-emitting devices 394B connected to the plurality of display control apparatuses 394A. The light-emitting device 394B may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a Miniled, a MicroLed, a Micro-oled, a quantum dot light emitting diode (quantum dot light emitting diodes, QLED), or the like. In some embodiments, the electronic device may include two or N display screens 394. N is a positive integer greater than 1. In some embodiments, a control chip 394C is configured to generate a control signal and a voltage required by the display control apparatus 394A. The display control apparatus 394A includes a first reset unit, a write unit, a light-emitting drive unit connected to the first reset unit and the write unit, and an adjustment unit connected to the light-emitting drive unit.

A series of graphical user interfaces (graphical user interface, GUI) may be displayed on the display screen 394 of the electronic device, and these GUIs are main screens of the electronic device. Generally, the size of the display screen 394 of the electronic device is fixed, and only a limited quantity of controls can be displayed in the display screen 394 of the electronic device. A control is a GUI element, is a software component included in an application program, and controls all data processed by the application program and interaction operations about these data. A user may interact with the control through a direct manipulation (direct manipulation), to read or edit related information of the application program. Generally, the control may include visual interface elements such as an icon, a button, a menu, a tab, a text box, a dialog box, a status bar, a navigation bar, and a widget.

The electronic device may implement a photographing function through the ISP, the camera 393, the video codec, the GPU, the display screen 394, and the application processor.

The ISP is configured to process data fed back by the camera 393. For example, during photographing, a shutter is enabled. Light is transmitted to a photosensitive element of the camera through a lens, and an optical signal is converted into an electrical signal. The photosensitive element of the camera transmits the electrical signal to the ISP for processing, and the electrical signal is converted into an image visible to a naked eye. The ISP may also optimize an algorithm for noise, brightness, and skin tone of an image. The ISP may also optimize parameters such as exposure and a color temperature of a photographing scenario. In some embodiments, the ISP may be disposed in the camera 393.

The camera 393 is configured to capture a static image or a video. An optical image of an object is generated through a lens and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in RGB and YUV formats. In some embodiments, the electronic device may include 1 or N cameras 393, where N is a positive integer greater than 1.

The digital signal processor is configured to process a digital signal, and in addition to a digital image signal, the digital signal processor may also process other digital signals. For example, when the electronic device performs frequency selection, the digital signal processor is configured to perform Fourier transform and the like on frequency energy.

The video codec is configured to compress or decompress a digital video. The electronic device may support one or more video codecs. In this way, the electronic device may play or record videos in a plurality of encoding formats, such as moving picture experts group (moving picture experts group, MPEG) 1, MPEG 2, MPEG 3, and MPEG 4.

The NPU is a neural-network (neural-network, NN) computing processor, quickly processes input information by using a structure of a biological neural network, for example, a transmission mode between neurons in a human brain, and may further continuously perform self-learning. The NPU may be used to implement an application, for example, intelligent cognition of the electronic device, such as image recognition, facial recognition, voice recognition, and text understanding.

The external memory interface 320 may be configured to be connected to an external storage card, for example, a Micro SD card, to expand a storage capability of the electronic device. The external storage card communicates with the processor 310 through the external memory interface 320, to implement a data storage function. For example, a file such as a music or a video is stored in the external storage card.

The internal memory 321 may be configured to store computer-executable program code, and the executable program code includes instructions. The processor 310 runs the instructions stored in the internal memory 321, to perform various function applications and data processing of the electronic device. The internal memory 321 may include a program storage region and a data storage region. The program storage region may store an operating system, an application program required by at least one function (such as a voice playing function or an image playing function), and the like. The data storage region may store data (such as audio data and an address book) created during use of the electronic device. In addition, the internal memory 321 may include a high-speed random access memory, and may also include a non-volatile memory such as at least one magnetic disk memory, a flash memory, or a universal flash storage (universal flash storage, UFS). The processor 310 runs the instructions stored in the internal memory 321 and/or the instructions stored in the memory disposed in the processor, to implement various functional applications and data processing of the electronic device.

The electronic device may implement an audio function such as music playing and recording through the audio module 370, the application processor, and the like.

The audio module 370 is configured to convert digital audio information into an analog audio signal output, and is also configured to convert an analog audio input into a digital audio signal. The audio module 370 may also be configured to encode and decode audio signals. In some embodiments, the audio module 370 may be disposed in the processor 310, or some functional modules of the audio module 370 may be arranged in the processor 310.

The pressure sensor 380A is configured to sense a pressure signal, and may convert the pressure signal into an electrical signal. In some embodiments, the pressure sensor 380A may be disposed on the display screen 394. There are many types of pressure sensors 380A, such as a resistive pressure sensor, an inductive pressure sensor, and a capacitive pressure sensor. The capacitive pressure sensor may be a parallel plate including at least two conductive materials. When a force is applied onto the pressure sensor 380A, a capacitance between electrodes changes. The electronic device determines an intensity of pressure based on a change of the capacitance. When a touch operation is performed on the display screen 394, the electronic device detects an intensity of the touch operation by using the pressure sensor 380A. The electronic device may also calculate a touch position based on a detection signal of the pressure sensor 380A. In some embodiments, touch operations that are performed on a same touch position but have different touch operation intensities may correspond to different operation instructions. For example, when a touch operation whose touch operation intensity is less than a first pressure threshold is performed on a short message application icon, an instruction of checking a short message is executed. When a touch operation whose touch operation intensity is greater than or equal to the first pressure threshold is performed on the short message application icon, an instruction of creating a new short message is executed.

The key 390 includes a power key, a volume key, and the like. The key 390 may be a mechanical key, or may be a touch-type key. The electronic device may receive a key input, and generate a key signal input related to user setting and function control of the electronic device.

The motor 391 may generate a vibration prompt. The motor 391 may be configured for an incoming call vibration prompt and a touch vibration feedback. For example, touch operations performed on different applications (such as photographing and audio playing) may correspond to different vibration feedback effects. For touch operations performed on different regions of the display screen 394, the motor 391 may correspond to different vibration feedback effects. Different application scenarios (such as a time reminder, information receiving, an alarm clock, and a game) may also correspond to different vibration feedback effects. Customization of a touch vibration feedback effect may also be supported.

The indicator 392 may be an indicator light, and may be configured to indicate a charging state or a battery change, or may be configured to indicate a message, a missed call, a notification, or the like.

The SIM card interface 395 is configured to connect a SIM card. The SIM card may be inserted into the SIM card interface 395 or unplugged from the SIM card interface 395, to come into contact with or be separated from the electronic device. The electronic device may support one or N SIM card interfaces, N being a positive integer greater than 1. The SIM card interface 395 may support a Nano SIM card, a Micro SIM card, a SIM card, and the like. A plurality of cards may be inserted into a same SIM card interface 395 at the same time. The plurality of cards may be of a same type or different types. The SIM card interface 395 may also be compatible with different types of SIM cards. The SIM card interface 395 may also be compatible with external memory cards. The electronic device interacts with the network through the SIM card to implement functions such as call and data communication. In some embodiments, the electronic device uses an eSIM, namely, an embedded SIM card. The eSIM card may be embedded in the electronic device and cannot be separated from the electronic device.

In addition, an operating system runs on the foregoing components, such as a Harmony operating system, an iOS operating system, an Android operating system, and a Windows operating system. An application program may be installed and run on the operating system.

The operating system of the electronic device may use a layered architecture, an event-driven architecture, a microkernel architecture, a micro service architecture, or a cloud architecture.

A working process of the display screen 394 of the electronic device in this application is described below by using examples.

In a write frame, the display control apparatus 394A outputs, through an adjustment unit under the control of a first control signal, an adjustment voltage to a control-end back channel of a drive thin-film transistor in a light-emitting drive unit, where the adjustment voltage is a positive voltage; and outputs, through a first reset unit under the control of a second control signal, a first reset voltage to a control end of the drive thin-film transistor in the light-emitting drive unit to reset the drive thin-film transistor, where the first reset voltage is a negative voltage. Then the light-emitting drive unit resets the drive thin-film transistor through the received first reset voltage, and increases a threshold voltage of the drive thin-film transistor through the adjustment voltage. After the drive thin-film transistor is reset, a write unit outputs a data voltage under the control of a fifth control signal; and then under the control of a third control signal, the light-emitting drive unit writes the received data voltage to a gate of the drive thin-film transistor and compensates the threshold voltage of the drive thin-film transistor to the control end of the drive thin-film transistor, so that under the control of a fourth control signal, a first drive power supply voltage may be outputted to the light-emitting device 394B, and the light-emitting device 394B emits light. In a hold frame, the write unit outputs the data voltage to the light-emitting drive unit, and the light-emitting drive unit receives the data voltage to prevent the threshold voltage of the drive thin-film transistor from being fixed into a negative bias state at the beginning of the write frame, so as to prevent the threshold voltage of the drive thin-film transistor from being negatively biased; and moreover an electric potential of the control end of the drive thin-film transistor is maintained at a fixed voltage value, so that under the control of the fourth control signal, the first drive power supply voltage is outputted to the light-emitting device to control the light-emitting device to emit light. The fixed voltage value is a sum of the threshold voltage of the drive thin-film transistor and the data voltage. The first control signal, the second control signal, the third control signal, the fourth control signal, the data voltage, the first reset voltage, the adjustment voltage, and the first drive power supply voltage in the display control apparatus are generated by the control chip 394C.

As the adjustment unit connected to the light-emitting drive unit outputs, in the write frame under the control of the first control signal, the adjustment voltage to the control-end back channel of the drive thin-film transistor in the light-emitting drive unit, to adjust the threshold voltage of the drive thin-film transistor, a transfer characteristic curve of the drive thin-film transistor shifts forward in the write frame based on the threshold voltage, that is, the threshold voltage shifts forward, making it easier for the drive thin-film transistor to turn on in the write frame, and increasing the brightness of the drive thin-film transistor in the write frame. As a result, the light-emitting drive unit controls the light-emitting brightness of the light-emitting device in the write frame and the hold frame to avoid deviation, thereby preventing flickering.

The embodiments of this application are described below in detail with reference to FIG. 4 to FIG. 8.

Figure 4:
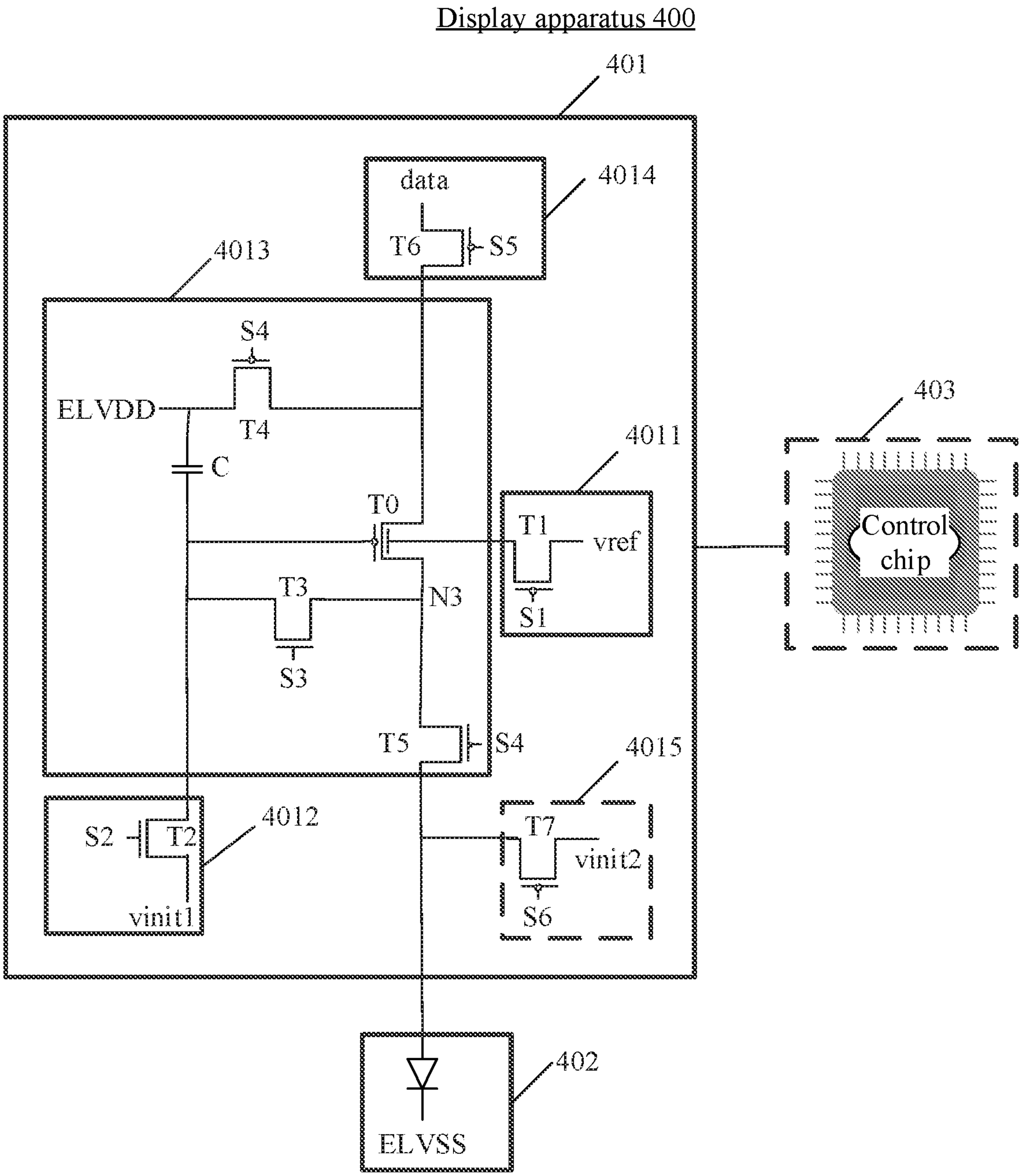
FIG. 4 is a schematic structural diagram of a display apparatus according to an embodiment of this application.

FIG. 4 is a schematic diagram of a display apparatus according to an embodiment of this application. As shown in FIG. 4, the display apparatus 400 may include: a display control apparatus 401, a light-emitting device 402, and a control chip 403. The display control apparatus 401 is connected to the light-emitting device 402, and the control chip 403 is connected to the light-emitting device 402 and the display control apparatus 401 respectively.

The display control apparatus 401 includes: an adjustment unit 4011, a first reset unit 4012, a light-emitting drive unit 4013, a write unit 4014, and a second reset unit 4015. The light-emitting drive unit 4013 is connected to the adjustment unit 4011, the first reset unit 4012, the write unit 4014, and the second reset unit 4015 respectively.

The adjustment unit 4011 includes: a first transistor T1, where a control end of the first transistor T1 receives a first control signal S1, an input end of the first transistor T1 receives the adjustment voltage vref, an output end of the first transistor T1 is connected to the control-end back channel of the drive thin-film transistor T0 in the light-emitting drive unit 4013.

The first reset unit 4012 includes: a second transistor T2, where a control end of the second transistor T2 receives a second control signal S2, an input end of the second transistor T2 receives the first reset voltage Vinit1, an output end of the second transistor T2 is connected to a control end of the drive thin-film transistor T0 in the light-emitting drive unit 4013.

The light-emitting drive unit 4013 includes: a third transistor T3, a fourth transistor T2, a fifth transistor T5, a capacitor C, and the drive thin-film transistor T0. A control end of the third transistor T3 receives a third control signal S3, an input end of the third transistor T3 is connected to an output end of the drive thin-film transistor T0, and an output end of the third transistor T3 is connected to a control end of the drive thin-film transistor T0.

A control end of the fourth transistor T2 receives a fourth control signal S4, an input end of the fourth transistor receives a first drive power supply voltage ELVDD, an output end of the fourth transistor T2 is connected to an input end of the drive thin-film transistor T0, and the input end of the drive thin-film transistor T0 is also connected to a sixth transistor T6 in the write unit 4014 and is further configured to receive a data voltage data outputted by the write unit 4014.

A control end of the fifth transistor T5 receives the fourth control signal S4, an input end of the fifth transistor T5 is connected to the output end of the drive thin-film transistor T0, and an output end of the fifth transistor T5 is connected to the light-emitting device 402. The output end of the fifth transistor T5 outputs the first drive power supply voltage ELVDD.

One end of the capacitor C is connected to the control end of the drive thin-film transistor T0, and the other end of the capacitor C is connected to the input end of the fourth transistor T2.

The write unit 4014 includes: a sixth transistor T6, where a control end of the sixth transistor T6 receives a fifth control signal S5, an input end of the sixth transistor T6 receives the data voltage data, the sixth transistor T6 outputs the data voltage data.

The second reset unit 4015 includes: a seventh transistor T7, where a control end of the seventh transistor T7 receives a sixth control signal S6, an input end of the seventh transistor T7 receives the second reset voltage Vinit2, an output end of the seventh transistor T7 outputs the second reset voltage Vinit2.

An anode of the light-emitting device 402 is connected to the output end of the fifth transistor T5 and is configured to receive the first drive power supply voltage ELVDD outputted by the output end of the fifth transistor T5. A cathode of the light-emitting device 402 receives a second drive power supply voltage ELVSS.

The control chip 403 is configured to generate the first control signal S1, the second control signal S2, the third control signal S3, the fourth control signal S4, the fifth control signal S5, the sixth control signal S6, the adjustment voltage vref, the data voltage data, the first drive power supply voltage ELVDD, and the second drive power supply voltage ELVSS. The control chip 403 outputs the generated first control signal S1 to the control end of the first transistor T1, outputs the second control signal S2 to the control end of the second transistor T2, outputs the third control signal S3 to the control end of the third transistor S3, outputs the fourth control signal S4 to the control end of the fourth transistor T2 and the control end of the fifth transistor T5, outputs the fifth control signal S5 to the control end of the sixth transistor S6, outputs the sixth control signal S6 to the control end of the seventh transistor T7, outputs the data voltage data to the input end of the sixth transistor T6, inputs the adjustment voltage vref to the input end of the first transistor T1, inputs the first drive power supply voltage ELVDD to the input end of the fourth transistor T2, and inputs the second drive power supply voltage ELVSS to the cathode of the light-emitting device 402.

In some other embodiments, the first control signal S1, the second control signal S2, the third control signal S3, the fourth control signal S4, the fifth control signal S5, the sixth control signal S6, the adjustment voltage vref, the data voltage data, the first drive power supply voltage ELVDD, and the second drive power supply voltage ELVSS may be provided by a signal generator or a power supply inside the display control apparatus 401 and the light-emitting device 402. That is, in some embodiments, there may be no control chip 403.

The data voltage data, the adjustment voltage vref, and the first drive power supply voltage ELVDD are positive voltages. The second drive power supply voltage ELVSS, the first reset voltage Vinit1, and the second reset voltage Vinit2 are negative voltages.

In some embodiments, the drive thin-film transistor T0, the first transistor T1, the fourth transistor T4, the fifth transistor T5, the sixth transistor T6, and the seventh transistor T7 are P-type transistors, and the second transistor T2 and the third transistor T3 are N-type transistors. The P-type transistors are turned on under low-level control, and the N-type transistors are turned on under high-level control. The transistors involved in FIG. 4 may be thin-film transistors (Thin Film Transistor, TFT) or indium gallium zinc oxide (Indium Gallium Zinc Oxide, IGZO) transistors, or may be metal oxide semiconductor (Metal Oxide Semiconductor, MOS) field-effect transistors or other switching devices with controllable switching functions. In some other embodiments, to better maintain the electric potential of the control end of the drive thin-film transistor T0, in other words, to make the electric potential of the control end of the drive thin-film transistor T0 stable, the second transistor T2 and/or the third transistor T3 may be made of IGZO. This is because a leakage current of the IGZO is small, and it is easier to maintain the electric potential of the control end of the drive thin-film transistor T0.

In some other embodiments, circuit structures of the first reset unit, the light-emitting drive unit, and the write unit in the display control apparatus 401 may constitute other 7T1C, 6T1C, and 9T1C designs. That is, the adjustment unit 4011 in the embodiments of this application may be connected to other 7T1C, 6T1C, and 9T1C circuits to implement the functions of the display control apparatus 4011 in the embodiments of this application. In other words, the first reset unit 4012, the light-emitting drive unit 4013, and the write unit 4014 in the embodiments of this application may alternatively have other types of circuit structures. 7T1C refers to circuit structures of the first reset unit 4012, the light-emitting drive unit 4013, and the write unit 4014 in the display control apparatus 401 consisting of seven thin-film transistors and one capacitor. 6T1C and 9T1C are similar to 7T1C.

In some embodiments, the control end of the transistor is a gate, the input end of the transistor is a source, and the output end of the transistor is a drain.

In some embodiments, the light-emitting device 402 may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a Miniled, a MicroLed, a Micro-oled, a quantum dot light emitting diode (quantum dot light emitting diodes, QLED), or the like.

In some embodiments, a display device such as a display screen or a display panel suitable for the electronic device may be composed of several display apparatuses 400 arranged in a specific manner.

In some embodiments, the display control apparatus 401 may include no second reset unit 4015, in other words, the second reset unit 4015 is not a necessary unit.

In some embodiments, the control signal involved in the display control apparatus 401 may be a voltage control signal, or may be a current control signal or another type of control signal.

Figure 5:
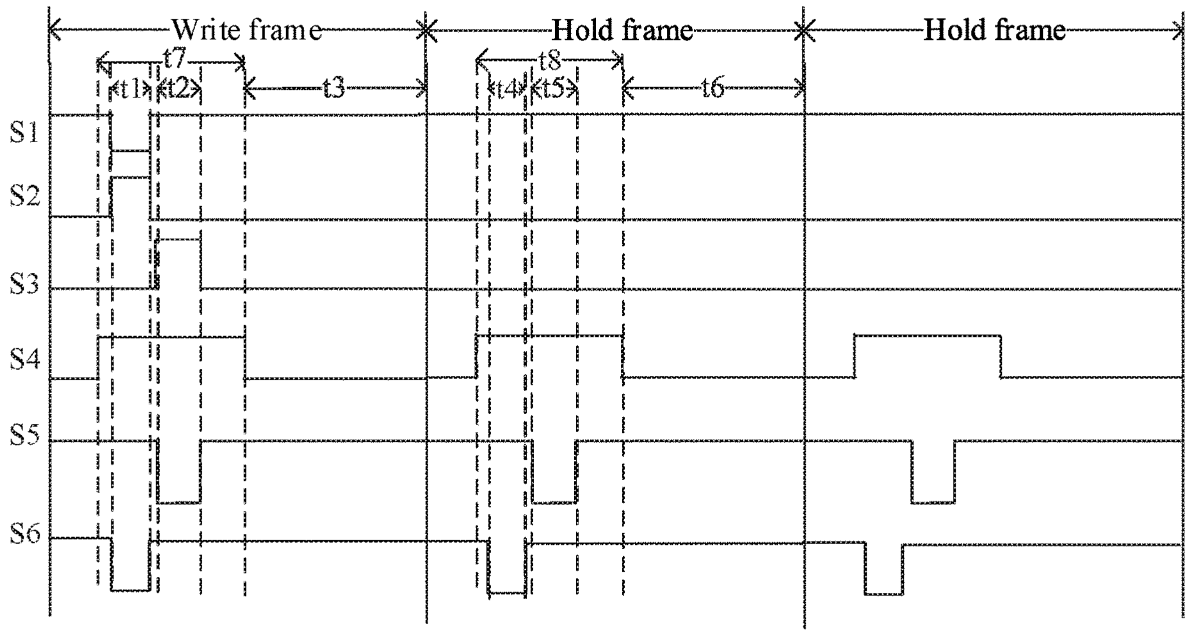
FIG. 5 is a diagram of an example of level time sequence change of a control signal of a display control apparatus 401 in a write frame and a hold frame according to an embodiment of this application.

Referring to FIG. 5, FIG. 5 is a diagram of an example of level time sequence change of the first control signal S1, the second control signal S2, the third control signal S3, the fourth control signal S4, the fifth control signal S5, and the sixth control signal S6 of the display control apparatus 401 in a write frame and a hold frame. In FIG. 5, a signal time sequence change in a second hold frame is consistent with that in a first hold frame. In FIG. 5, only two hold frames are given as an example. In an actual scenario, there may be a plurality of hold frames, and an execution process and principle of the display control apparatus 401 may be the same in each hold frame.

In a period of time t1 of a write frame, the adjustment unit 4011 outputs, under low-level control of the first control signal S1, the adjustment voltage vref to the control-end back channel of the drive thin-film transistor T0 in the light-emitting drive unit 4013, the first reset unit 4012 outputs, under high-level control of the second control signal S2, the first reset voltage vinit1 to the control end of the drive thin-film transistor T0 in the light-emitting drive unit 4013, and the light-emitting drive unit 4013 resets the drive thin-film transistor T0 in the light-emitting drive unit through the first reset voltage vinit1 and shifts the threshold voltage of the drive thin-film transistor T0 forward through the adjustment voltage vref. The second reset unit 4015 outputs, under low-level control of the sixth control signal, a preset initialized voltage, to reset the light-emitting device to a voltage value at the beginning of each frame. In a period of time t2 of the write frame, the write unit 4014 outputs the data voltage data under low-level control of the fifth control signal S5; and under high-level control of the third control signal S3, the light-emitting drive unit 4013 writes the received data voltage data to the control end of the drive thin-film transistor T0 and compensates the threshold voltage of the drive thin-film transistor T0 to the control end of the drive thin-film transistor T0, so that in a period of time t3 of the write frame, the light-emitting drive unit 4013 can output, under low-level control of the fourth control signal S4, the first drive power supply voltage ELVDD to the light-emitting device 402. The first reset voltage vinit1 is a negative voltage, and the adjustment voltage vref is a positive voltage.

In a period of time t5 of a hold frame, the second reset unit 4015 outputs, under low-level control of the sixth control signal S6, the second reset voltage vinit2, to reset the light-emitting device 402. In a period of time t6, the write unit 4014 outputs the data voltage data under low-level control of the fifth control signal S5; and the light-emitting drive unit 4013 prevents the threshold voltage of the drive thin-film transistor T0 from negative bias through the received data voltage data and maintains the electric potential of the control end of the drive thin-film transistor T0 at a fixed voltage value, so that in a period of time t7, the light-emitting drive unit 4013 can output, under low-level control of the fourth control signal S4, the first drive power supply voltage ELVDD to the light-emitting device. The fixed voltage value is a sum of the threshold voltage of the drive thin-film transistor and the data voltage.

As an adjustment unit outputs, under the control of a first control signal S1 in a period of time t1 of a write frame, an adjustment voltage vref to a control-end back channel of a drive thin-film transistor T0 in a light-emitting drive unit, so that the influence of negative bias of a threshold voltage of the drive thin-film transistor T0 caused by a negative voltage of a first reset voltage vinit1, and therefore a transfer characteristic curve of the drive thin-film transistor T0 shifts forward in the write frame, that is, the threshold voltage shifts forward, making it easier for the drive thin-film transistor T0 to turn on in the write frame, and increasing the brightness of the drive thin-film transistor T0 in the write frame. As a result, the light-emitting drive unit controls the light-emitting brightness of a light-emitting device in the write frame and a hold frame to avoid deviation, thereby preventing flickering.

Figure 6A:
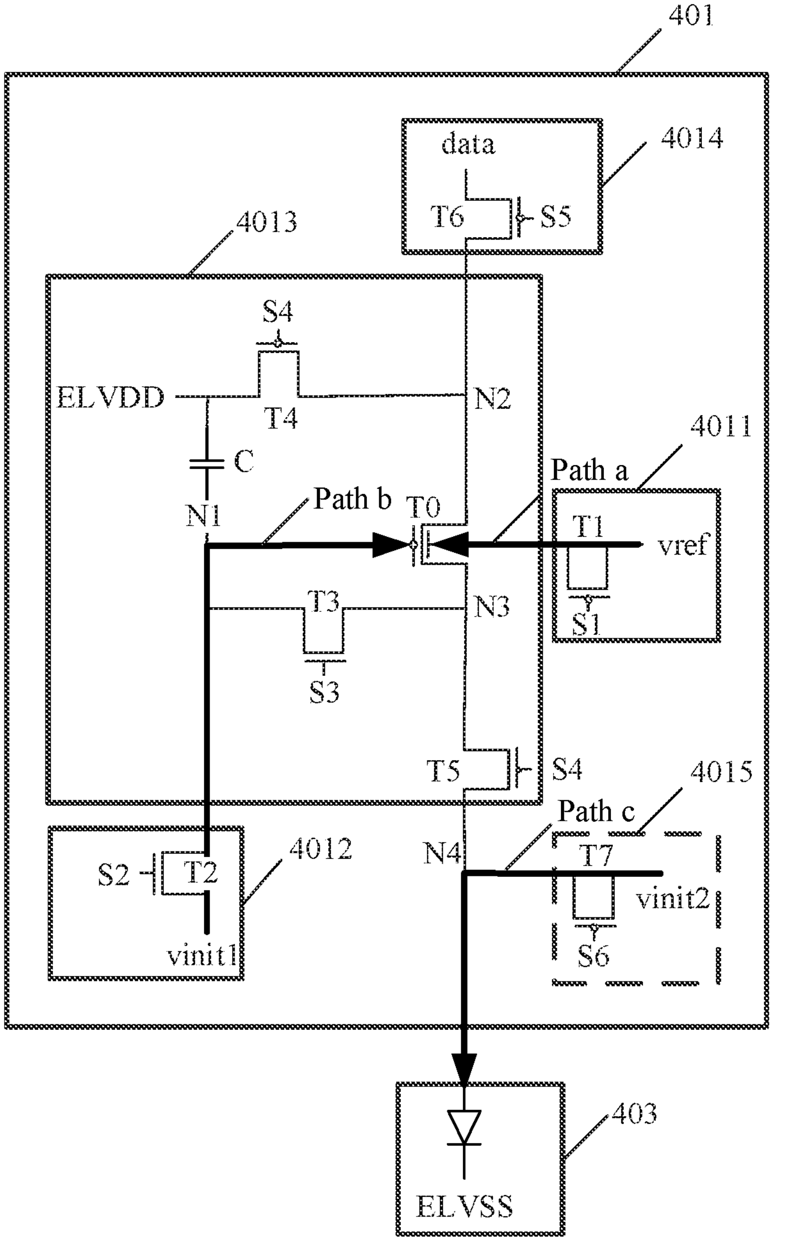
FIG. 6*a* is a diagram of a voltage transmission path of a display control apparatus 401 in a period of time t1 of a write frame according to an embodiment of this application.

Specifically, referring to FIG. 5, in the period of time t1 of the write frame, the first control signal S1 is at a low level, the second control signal S2 is at a high level, the third control signal S3 is at a low level, the fourth control signal S4 is at a high level, the fifth control signal S5 is at a high level, and the sixth control signal S6 is at a low level. In this case, referring to FIG. 6*a*, FIG. 6*a* is a diagram of a voltage transmission path inside the display control apparatus 401 in the period of time t1. In the period of time t1, the first transistor T1 is turned on under low-level control of the first control signal S1, the second transistor T2 is turned on under high-level control of the second control signal S2, the third transistor T3 is cut off (turned off) under low-level control of the third control signal S3, the fourth transistor T2 is turned off under high-level control of the fourth control signal, the fifth control transistor T5 is turned off under high-level control of the fourth control signal S4, the sixth transistor T6 is turned off under high-level control of the fifth control signal S5, and the seventh transistor T7 is turned on under low-level control of the sixth control signal S6. Therefore, in the period of time t1, the transistors that are turned on in the display control apparatus 401 include the first transistor T1, the second transistor T2, and the seventh transistor T7.

As shown in FIG. 6*a*, the transmission path in the period of time t1 of the write frame is as follows. The adjustment voltage vref received by the adjustment unit 4011 is transmitted to the control-end back channel of the drive thin-film transistor T0 through the turned-on first transistor T1 to form a path a. The first reset voltage vinit1 received by the first reset unit 4012 is transmitted to the control end of the drive thin-film transistor T0 through the turned-on second transistor T2 and a first node N1 to form a path b. The second reset voltage vinit2 received by the second reset unit 4015 is transmitted to the light-emitting device 402 through the turned-on seventh transistor T7 and a node N4 to form a path c. A voltage value of the second reset voltage vinit2 is less than or equal to that of the second drive power supply voltage ELVSS.

Still referring to FIG. 6*a*, the specific working process of the display control apparatus 401 in the period of time t1 of the write frame is as follows. In the period of time t1 of the write frame, the first reset unit 4012 outputs, under high-level control of the second control signal S2, the first reset voltage vinit1 to the control end of the drive thin-film transistor T0 in the light-emitting drive unit 4013 through the path b, where the first reset voltage vinit1 is a negative voltage. The light-emitting drive unit 4013 resets the drive thin-film transistor T0 through the first reset voltage vinit1, without interference from the signal of a previous frame, and applies a negative voltage to the drive thin-film transistor T0 in the period of time t1 of the write frame, which helps turn on the drive thin-film transistor T0 subsequently (the drive thin-film transistor T0 is turned on when the gate-source voltage Vgs is lower than the threshold voltage Vth). The adjustment unit 4011 outputs, under low-level control of the first control signal S1, the adjustment voltage vref to the control-end back channel of the drive thin-film transistor T0 in the light-emitting drive unit 4013 through the path a, to reduce the influence of the first reset voltage vinit1 on the transfer characteristic curve of the drive thin-film transistor TO, so that the transfer characteristic curve of the drive thin-film transistor T0 shifts forward under the action of the adjustment voltage vref, that is, the threshold voltage Vth of the drive thin-film transistor T0 shifts forward. Subsequently, in the light-emitting period of time of the light-emitting device 402 in the write frame, the drive thin-film transistor T0 is easier to turn on, a drain-source voltage of the drive thin-film transistor T0 is increased, and therefore the brightness of the light-emitting device 402 in the write frame is also increased. For example, originally the first reset voltage vinit1 is −3 V, and the adjustment voltage vref is 4 V, so the negative bias of the threshold voltage of the drive thin-film transistor is reduced, and the threshold voltage shifts forward. In the period of time t1 of the write frame, the second reset unit 4015 transmits, under low-level control of the sixth control signal, the second reset voltage vinit2 to the anode of the light-emitting device 402 through the path c. As the voltage value of the second reset voltage vinit2 is less than or equal to that of the second drive power supply voltage ELVSS, charges at both ends of the light-emitting device 402 can be removed, that is, a capacitance of the light-emitting device 402 can be released, so that the light-emitting brightness of the light-emitting device 402 in this frame will not be affected by the previous frame, which is equivalent to resetting the light-emitting device 402.

It is to be noted that, referring to FIG. 5, in addition to being at a low level in the period of time t1, the first control signal S1 may be at a low level at any time in a period of time t7 or even the entire period of time t7 of the write frame. That is, the adjustment unit 4011 may output, under low-level control of the first control signal S1 in the period of time t1 of the write frame, the adjustment voltage vref to the control-end back channel of the drive thin-film transistor T0 through the path a, and may also output, under low-level control of the first control signal S1 at any time in the period of time t7 of the write frame, the adjustment voltage vref to the control-end back channel of the drive thin-film transistor T0 through the path a. In other words, the adjustment unit 4011 only needs to output the adjustment voltage vref to the control-end back channel of the drive thin-film transistor T0 in the non-light-emitting period of time (t7) of the light-emitting device in the write frame. The longer the duration of outputting the adjustment voltage vref to the drive thin-film transistor T0 is, the more the threshold voltage of the drive thin-film transistor T0 increases, and the easier it is to increase the brightness of the light-emitting device 402 in the write frame. In some embodiments, a value of the adjustment voltage vref may be adjusted to adjust the brightness of the light-emitting device 402 in the write frame, and a larger value of the adjustment voltage vref indicates a higher brightness of the light-emitting device 402 in the write frame. For example, the adjustment voltage vref may be set to a value from 0 V to 5 V, and the value of the adjustment voltage vref may be specifically set based on an actually required gray scale (namely, a target gray scale) of the light-emitting device. For example, when the gray scale is 8, the value of the adjustment voltage vref may be set to a vref1 value; and when the gray scale is 16, the value of the adjustment voltage vref may be set to a vref2 value.

Similarly, the sixth control signal S6 may be at a low level at any time in the period of time t2 of the write frame or even the entire period of time t. That is, the second reset unit 4015 may transmit, under low-level control of the sixth control signal S6 in the period of time t1, the second reset voltage vinit2 to the anode of the light-emitting device 402 through the path c, and may also transmit, under low-level control of the sixth control signal S6 at any time in the period of time t7, the second reset voltage vinit2 to the anode of the light-emitting device 402 through the path c. In other words, the second reset voltage vinit2 only needs to be transmitted to the anode of the light-emitting device 402 in the non-light-emitting period of time (t7) of the light-emitting device in the write frame.

It is to be further noted that, in some other embodiments, the first reset unit 4012 may turn on the second transistor T2 and output the first reset voltage vinit1 under low-level control of the first control signal S1. In some other embodiments, components included in the first reset unit 4012 and a connection relationship among the components may be different from those of the first reset unit 4012 shown in FIG. 6*a*, and the first reset unit 4012 with another structure may also output, under the control of a plurality of control signals, the first reset voltage vinit1 in the period of time t1 of the write frame. That is, the first reset unit 4012 outputs the first reset voltage vinit1 in the period of time t1 of the write frame to reset the drive thin-film transistor T0 in many specific implementation manners, including but not limited to the content proposed in this embodiment of this application. Similarly, in some other embodiments, the adjustment unit 4011 may output, under high-level control of the first control signal S1 in the non-light-emitting period of time of the light-emitting device in the write frame, the adjustment voltage vref to the control-end back channel of the drive thin-film transistor T0 through the path a. Components included in the adjustment unit 4011 and a connection relationship among the components may be different from those of the adjustment unit 4011 shown in FIG. 6*a*, and the adjustment unit 4011 with another structure may also output, under the control of a plurality of control signals in the non-light-emitting period of time of the light-emitting device in the write frame, the adjustment voltage vref to the control-end back channel of the drive thin-film transistor T0. That is, the adjustment unit 4011 outputs the adjustment voltage vref to the control-end back channel of the drive thin-film transistor T0 in the non-light-emitting period of time of the light-emitting device in the write frame in many specific implementation manners, including but not limited to the content proposed in this embodiment of this application. Similarly, the second reset unit 4015 transmits the second reset voltage vinit2 to the anode of the light-emitting device 402 in the non-light-emitting period of time of the light-emitting device in the write frame in many specific implementation manners, including but not limited to the content proposed in this embodiment of this application.

Figure 6B:
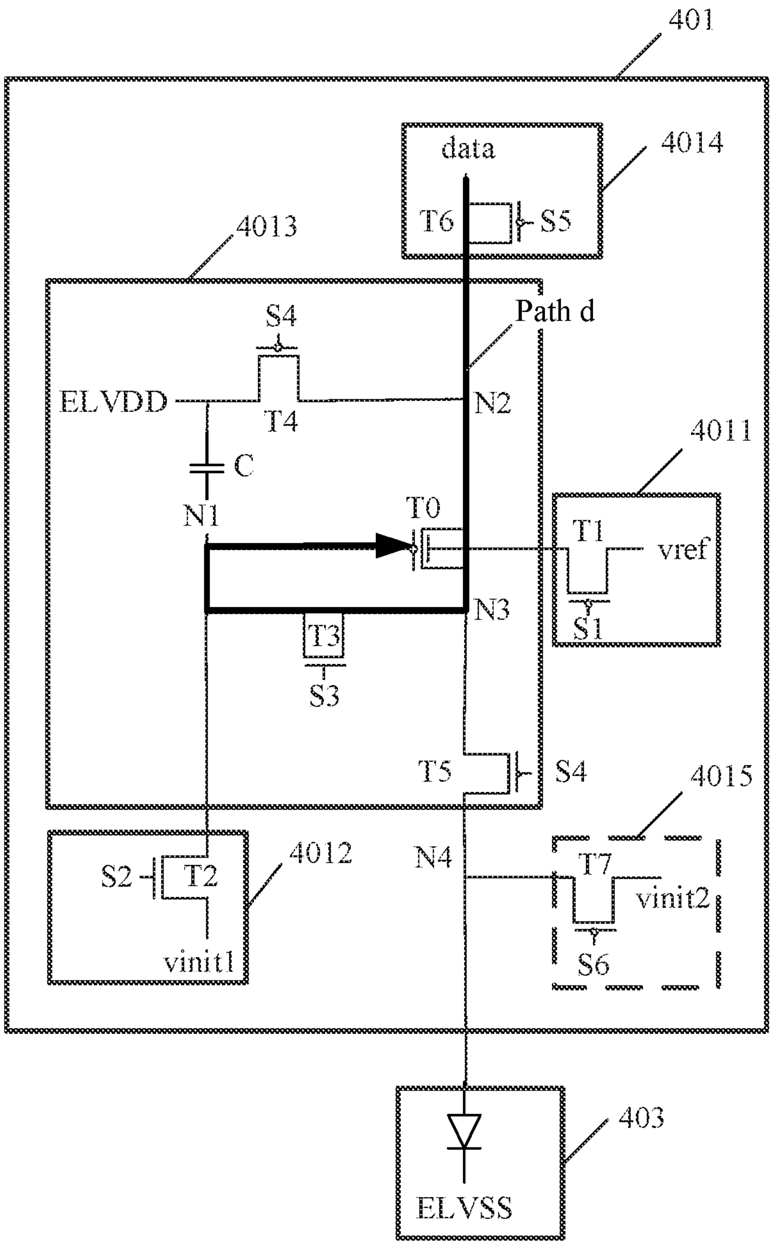
FIG. 6*b* is a diagram of a voltage transmission path of a display control apparatus 401 in a period of time t2 of a write frame according to an embodiment of this application.

Still referring to FIG. 5, in the period of time t2 of the write frame, the first control signal S1 is at a high level, the second control signal S2 is at a low level, the third control signal S3 is at a high level, the fourth control signal S4 is at a high level, the fifth control signal S5 is at a low level, and the sixth control signal S6 is at a high level. In this case, referring to FIG. 6*b*, FIG. 6*a* is a diagram of a voltage transmission path inside the display control apparatus 401 in the period of time t2. In the period of time t2, the first transistor T1 is turned off under high-level control of the first control signal S1, the second transistor T2 is turned off under low-level control of the second control signal S2, the third transistor T3 is turned on under high-level control of the third control signal S3, the fourth transistor T4 and the fifth transistor T5 are turned off under high-level control of the fourth control signal, the sixth transistor T6 is turned on under low-level control of the fifth control signal S5, and the seventh transistor T7 is turned off under high-level control of the sixth control signal S6. Therefore, in the period of time t2 of the write frame, the third transistor T3 and the sixth transistor T6 are turned on.

As shown in FIG. 6*b*, the transmission path in the period of time t2 of the write frame is as follows. The write unit 4014 outputs the data voltage data to the light-emitting drive unit 4013 through the turned-on sixth transistor T6. The light-emitting drive unit 403 also transmits the received data voltage data to the control end of the drive thin-film transistor T0 through a second node N2, the drive thin-film transistor T0 (in this case, the drive thin-film transistor is turned on as the first reset voltage is received on the control end in the period of time t1 and the input end is at the data voltage data, which satisfy turn-on conditions), a third node N3, the third transistor T3, and the first node N1 to form a path d. The light-emitting drive unit 4013 writes the data voltage data to the control end of the drive thin-film transistor T0 through the path d and compensates the threshold voltage of the drive thin-film transistor T0 to the control end of the drive thin-film transistor T0 through the turned-on third transistor T3.

Still referring to FIG. 6*b*, the specific working process of the display control apparatus 401 in the period of time t2 of the write frame is as follows. The write unit 4014 outputs the data voltage data under low-level control of the fifth control signal S5. Then, the light-emitting drive unit 4013 writes, under high-level control of the third control signal S3, the data voltage data to the control end of the drive thin-film transistor T0 in the light-emitting drive unit 4013 through the path d, and compensates the threshold voltage of the drive thin-film transistor T0 to the control end of the drive thin-film transistor T0 through the node N3, the third transistor T3, and the node N1, so as to maintain the electric potential of the control end of the drive thin-film transistor T0 at a fixed voltage value through the capacitor C. The fixed voltage value is a sum of the data voltage data and the threshold voltage of the drive thin-film transistor T0. After the data voltage data is written to the control end of the drive thin-film transistor T0, as the control end of the drive thin-film transistor T0 already has the maintained electric potential, subsequently the drive thin-film transistor can be turned on without outputting, by the write unit 4014, the data voltage data to the control end of the drive thin-film transistor T0 in the light-emitting period of time of the light-emitting device 402, so that a drive current can be transmitted to the light-emitting device 402 through the turned-on drive thin-film transistor T0 to emit light.

It is to be noted that, in the period of time t2 of the write frame, the write unit 4014 may output the data voltage data under low-level control of the fifth control signal S5, and in some other embodiments, may output the data voltage data under high-level control of the fifth control signal S5. In some other embodiments, a composition and a connection relationship of components included in the write unit 4014 may be different from those of the write unit 4014 shown in FIG. 6*b*, and the write unit 4014 with another structure may also output, under the control of a plurality of control signals, the data voltage data in the period of time t2 of the write frame. That is, the write unit 4014 outputs the data voltage data in the period of time t2 of the write frame in many specific implementation manners, including but not limited to the content proposed in this embodiment of this application. Similarly, in some other embodiments, in the period of time t2 of the write frame, the light-emitting drive unit 4013 may write, under low-level control of the third control signal S3, the data voltage data to the control end of the drive thin-film transistor T0 in the light-emitting drive unit 4013, and compensate the threshold voltage of the drive thin-film transistor T0 to the control end of the drive thin-film transistor TO. In some other embodiments, a composition and a connection relationship of components included in the light-emitting drive unit 4013 may be different from those of the light-emitting drive unit 4013 shown in FIG. 6*b*, and under the control of a plurality of control signals, the light-emitting drive unit 4013 with another structure may also write the data voltage data to the control end of the drive thin-film transistor T0 in the light-emitting drive unit 4013 in the period of time t2 of the write frame, and compensate the threshold voltage of the drive thin-film transistor T0 to the control end of the drive thin-film transistor T0. That is, the light-emitting drive unit 4013 writes the data voltage data to the control end of the drive thin-film transistor TO in the light-emitting drive unit 4013 in the period of time t2 of the write frame and compensates the threshold voltage of the drive thin-film transistor T0 to the control end of the drive thin-film transistor T0 in many specific implementation manners. In some other embodiments, only the data voltage data is written to the control end of the drive thin-film transistor T0 in the light-emitting drive unit 4013 without compensating the threshold voltage of the drive thin-film transistor T0 to the control end of the drive thin-film transistor T0. Whether to compensate the threshold voltage does not affect the implementation of the embodiments of this application. The specific process of writing the data voltage data by the light-emitting drive unit 4013 includes, but is not limited to, the content proposed in this embodiment of this application.

Figure 6C:
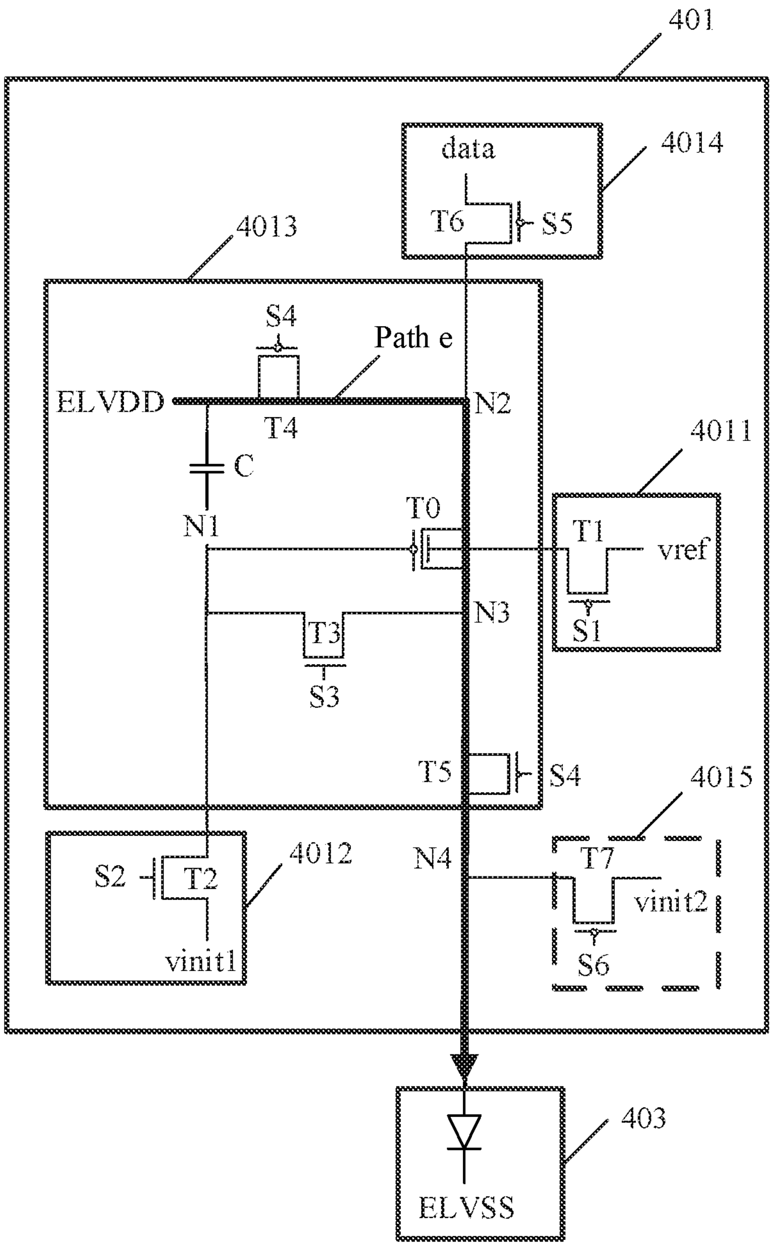
FIG. 6*c* is a diagram of a voltage transmission path of a display control apparatus 401 in a period of time t3 of a write frame according to an embodiment of this application.

Referring to FIG. 5, in the period of time t3 of the write frame, the first control signal S1 is at a high level, the second control signal S2 is at a low level, the third control signal S3 is at a low level, the fourth control signal S4 is at a low level, the fifth control signal S5 is at a high level, and the sixth control signal S6 is at a high level. In this case, referring to FIG. 6*c*, FIG. 6*c* is a diagram of a voltage transmission path inside the display control apparatus 401 in the period of time t3. In the period of time t3, the first transistor T1 is turned off under high-level control of the first control signal S1, the second transistor T2 is turned off under low-level control of the second control signal S2, the third transistor T3 is turned off under low-level control of the third control signal S3, the fourth transistor T4 and the fifth transistor T5 are turned on under low-level control of the fourth control signal, the sixth transistor T6 is turned off under high-level control of the fifth control signal S5, and the seventh transistor T7 is turned off under high-level control of the sixth control signal S6. Therefore, in the period of time t3 of the write frame, the fourth transistor T4 and the fifth transistor T5 are turned on. The data voltage data has been written to the control end of the drive thin-film transistor T0 in the period of time t2 of the write frame, and the electric potential of the control end is maintained at the fixed voltage value through the capacitor C. Therefore, in the period of time t3 of the write frame, the control end of the drive thin-film transistor T0 also has an electric potential.

As shown in FIG. 6*c*, the transmission path in the period of time t3 of the write frame is as follows. In the period of time t3 of the write frame, the light-emitting drive unit 4013 transmits the first drive power supply voltage ELVDD to the light-emitting device 402 through the fourth transistor T4, the second node N2, the drive thin-film transistor T0 (in this case, the voltage of the input end of the drive thin-film transistor T0 is the first drive power supply voltage ELVDD, the electric potential of the control end is the fixed voltage value, and the gate-source voltage is lower than the threshold voltage, which satisfy turn-on conditions of the drive thin-film transistor T0), the third node N3, the fifth transistor T5, and the fourth transistor N4 to form a path e.

Still referring to FIG. 6*c*, the specific working process of the display control apparatus 401 in the period of time t3 of the write frame is as follows. The light-emitting drive unit 4013 outputs, under low-level control of the fourth control signal S4, the first drive power supply voltage ELVDD to the light-emitting device 402. Due to the effect of the first reset voltage vinit1, the adjustment voltage vref, and the data voltage data on the light-emitting drive unit 4013, the control end of the drive thin-film transistor T0 has the electric potential of the fixed voltage value, so that under low-level control of the fourth control signal S4, the first drive power supply voltage ELVDD can be outputted to the light-emitting device 402 through the drive thin-film transistor T0 to control the light-emitting device 403 to emit light.

It is to be noted that, in some other embodiments, the light-emitting drive unit 4013 may output, under high-level control of the fourth control signal S4, the first drive power supply voltage ELVDD to the light-emitting device 402. Components included in the light-emitting drive unit 4013 and their connection manner may also be different from those shown in FIG. 6*c*. In some other embodiments, the light-emitting drive unit 4013 with another structure may output, under the control of a plurality of control signals, the first drive power supply voltage ELVDD to the light-emitting device 402 in the period of time t3 of the write frame. The light-emitting drive unit 4013 outputs the first drive power supply voltage ELVDD to the light-emitting device 402 in the period of time t3 of the write frame in many specific implementation manners, including but not limited to the content proposed in this embodiment of this application.

Referring to FIG. 5, in a period of time t4 of the hold frame, the first control signal S1 is at a high level, the second control signal S2 is at a low level, the third control signal S3 is at a low level, the fourth control signal S4 is at a high level, the fifth control signal S5 is at a high level, and the sixth control signal S6 is at a low level. In this case, only the seventh transistor T7 in the display control apparatus 401 is turned on under low-level control of the sixth control signal.

Figure 6D:
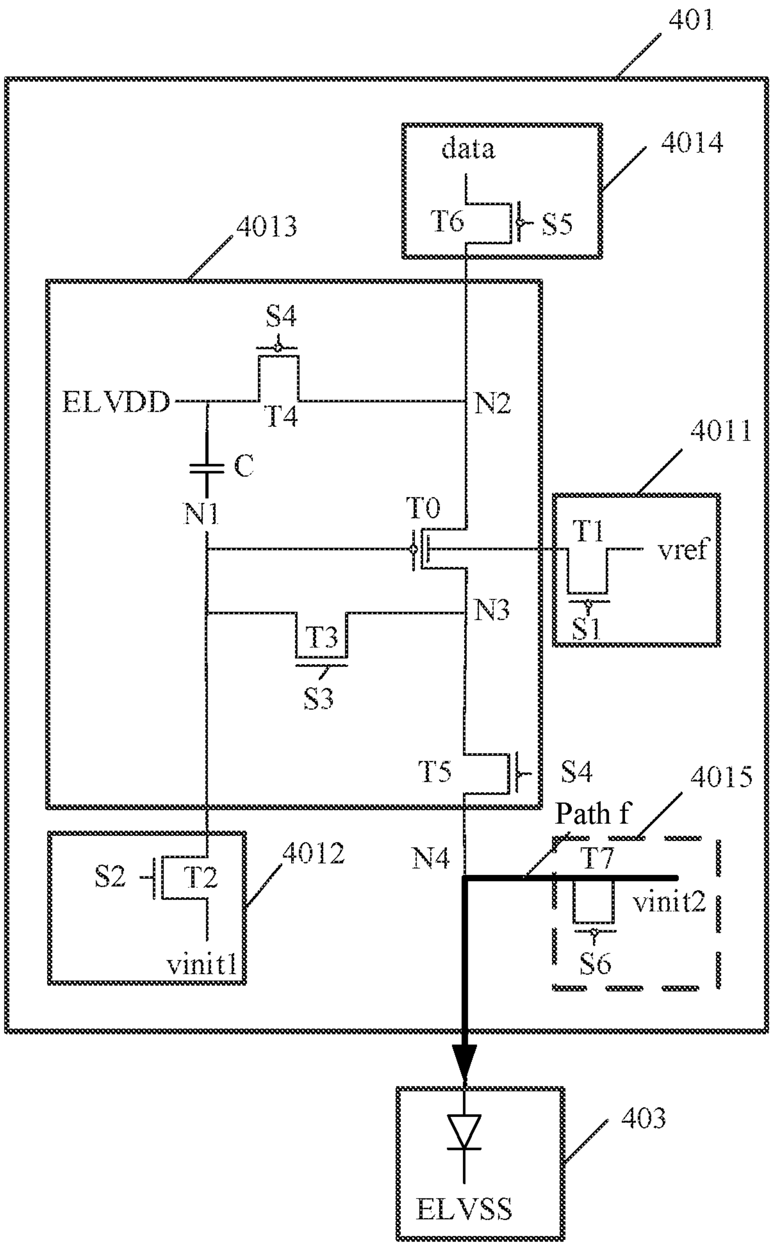
FIG. 6*d* is a diagram of a voltage transmission path of a display control apparatus 401 in a period of time t4 of a hold frame according to an embodiment of this application.

Referring to FIG. 6*d*, the transmission path in the period of time t4 of the hold frame is as follows. The second reset unit 4015 transmits the second reset voltage vinit2 to the light-emitting device 402 through the turned-on seventh transistor T7 and the fourth node N3 to form a path f In this case, the transmission path fin FIG. 6*d* is consistent with the path C in FIG. 6*a*. That is, the second reset unit 4015 outputs, under low-level control of the sixth control signal in the period of time t4 of the hold frame, the second reset voltage vinit2 to the light-emitting device 402. The specific implementation principle and process of outputting the second reset voltage vinit2 to the light-emitting device 402 by the second reset unit 4015 in the period of time t4 of the hold frame are consistent with the specific implementation principle and process of outputting the second reset voltage vinit2 to the light-emitting device 402 in the period of time t1 of the write frame mentioned in FIG. 6*a*, and details are not described herein again.

It is to be noted that, referring to FIG. 5, the second reset unit 4015 may output the second reset voltage vinit2 to the light-emitting device 402 in the hold frame not only in the period of time t4, but also at any time in the non-light-emitting period of time (namely, a period of time t8) of the light-emitting device in the hold frame. That is, the sixth control signal S6 may be at a low level at any time in the period of time t8 to control the second reset unit 4015 to output the second reset voltage vinit2 to the light-emitting device 402 in the non-light-emitting period of time of the light-emitting device in the hold frame. In some embodiments, the sixth control signal S6 may be a control signal that controls the output of the second reset voltage vinit2 to the light-emitting device 402 according to a second preset frequency in the write frame and the hold frame. The period of time in which the sixth control signal S6 controls the output of the second reset voltage vinit2 is the non-light-emitting period of time of the light-emitting device 402. In some other embodiments, the second preset frequency may be consistent with a screen refresh rate, and the screen refresh rate refers to a number of times a displayed picture is refreshed per second. For example, the display apparatus of the embodiments of this application is disposed in an electronic device, and the electronic device includes: a display screen. If a refresh rate of the display screen is 120 HZ, the second preset frequency is also 120 HZ.

Still referring to FIG. 5, in the period of time t5 of the hold frame, the first control signal S1 is at a high level, the second control signal S2 is at a low level, the third control signal S3 is at a low level, the fourth control signal S4 is at a high level, the fifth control signal S5 is at a low level, and the sixth control signal S6 is at a high level. In this case, only the sixth transistor S6 in the display control apparatus 401 is turned on.

Figure 6E:
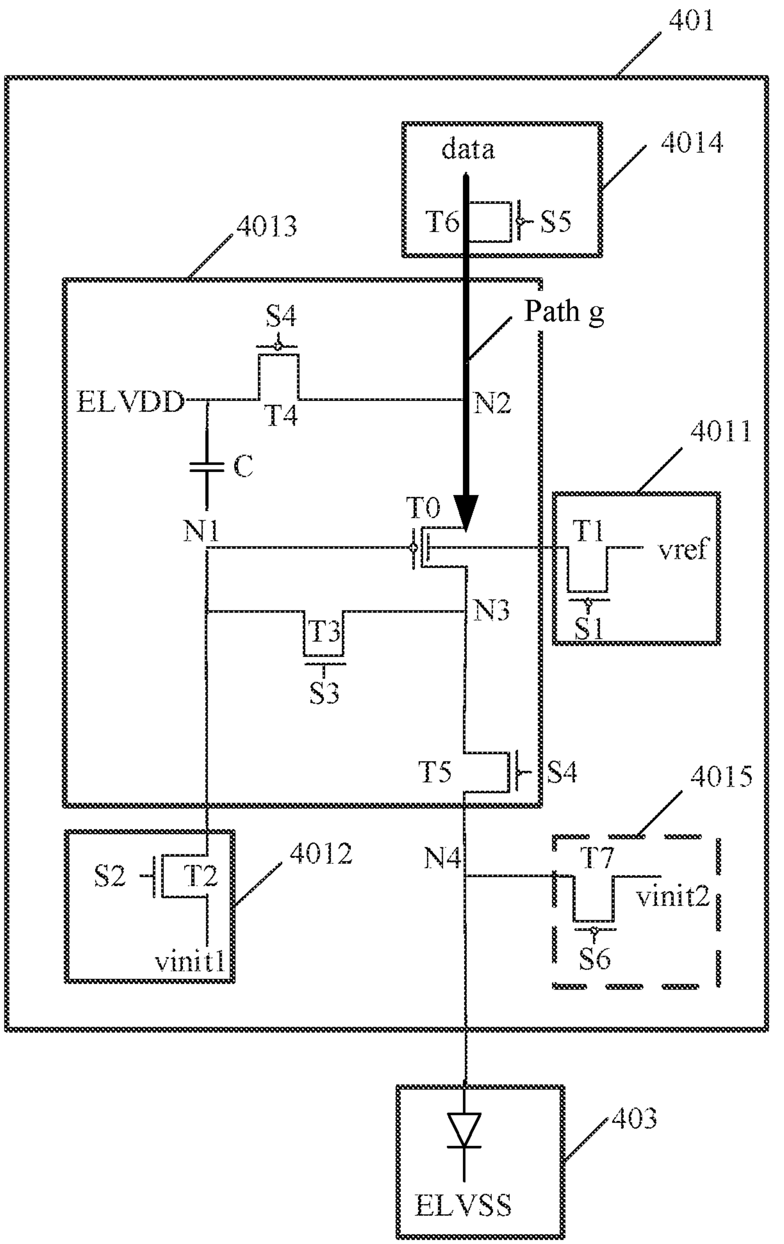
FIG. 6*e* is a diagram of a voltage transmission path of a display control apparatus 401 in a period of time t5 of a hold frame according to an embodiment of this application.

Referring to FIG. 6*e*, the transmission path in the period of time t5 of the hold frame is as follows. The write unit 4014 transmits the data voltage data to the input end of the drive thin-film transistor T0 to form a path g, to prevent the characteristics of drive thin-film transistor T0 from being fixed into a specific state (that is, to prevent the threshold voltage of the drive thin-film transistor T0 from being fixed into a negative bias state under the influence of the negative bias of the first reset voltage in the write frame), thereby preventing the light-emitting device 403 from flickering, resolving the problem of brightness shift in a low-frequency driving mode, and normalizing the brightness. In the related art, the data voltage data is not inputted to the input end of the drive thin-film transistor in the hold frame, so the threshold voltage of the drive thin-film transistor is fixed into the negative bias state under the influence of the first reset voltage vinit1 at the beginning of the write frame, easily causing flickering. In this application, in the period of time t5 of the hold frame, the data voltage data is written to the input end to prevent the light-emitting device 403 from flickering. It is to be noted that, in the period of time t5 of the hold frame, as the electric potential of the control end of the drive thin-film transistor T0 is the sum of the data voltage data and the threshold voltage, and the voltage value of the input end is the data voltage data, in this case, the gate-source voltage of the drive thin-film transistor T0 is exactly the threshold voltage, and the drive thin-film transistor T0 is in a critical turn-on state.

Still referring to FIG. 6*e*, the specific working process of the display control apparatus 401 in the period of time t5 of the hold frame is as follows. In the period of time t5 of the hold frame, the write unit 4014 outputs, under low-level control of the sixth control signal S6, the data voltage data to the light-emitting drive unit 4013, and the light-emitting drive unit 4013 maintains the electric potential of the control end of the drive thin-film transistor at the fixed voltage value through the received data voltage data. In some embodiments, the sixth control signal S6 may be a control signal that controls the output of the data voltage data to the light-emitting drive unit 4013 according to a first preset frequency in the write frame and the hold frame. The period of time in which the sixth control signal S6 controls the output of the data voltage data is the non-light-emitting period of time of the light-emitting device. A value of the first preset frequency may be specifically set according to an actual case. A higher value of the first preset frequency indicates a higher frequency of inputting the data voltage data to the light-emitting drive unit, and it is easier to prevent the characteristics of the drive thin-film transistor T0 form being fixed into a specific state. In some embodiments, the first preset frequency may be consistent with a screen refresh rate, and the screen refresh rate refers to a number of times a displayed picture is refreshed per second. For example, the display apparatus of the embodiments of this application is disposed in an electronic device, and the electronic device includes: a display screen. If a refresh rate of the display screen is 120 HZ, the first preset frequency is also 120 HZ.

It is to be further noted that, although it can be seen through the path g that the data voltage data is not written to the control end of the drive thin-film transistor T0, in the entire period of time of the hold frame, as the capacitor C has a function of maintaining an electric potential, the control end (namely, the first node N1) of the drive thin-film transistor T0 is always stably maintained at the fixed voltage value, and the transmission of the data voltage data to the input end of the drive thin-film transistor T0 is to prevent the characteristics of the drive thin-film transistor T0 from being fixed into a specific state and therefore to better maintain the threshold voltage of the drive thin-film transistor T0.

Referring to FIG. 5, in the period of time t6 of the hold frame, the first control signal S1 is at a high level, the second control signal S2 is at a low level, the third control signal S3 is at a low level, the fourth control signal S4 is at a low level, the fifth control signal S5 is at a high level, and the sixth control signal S6 is at a high level. Only the fourth transistor T4, the seventh transistor T7, and the drive thin-film transistor T0 (in this case, the electric potential of the input end of the drive thin-film transistor is the first drive power supply voltage ELVDD, and the electric potential of the control end is the fixed voltage value, which satisfy turn-on conditions of the drive thin-film transistor) in the display control apparatus 401 are turned on. In this case, the transmission path in the display control apparatus 401 is consistent with the path e in FIG. 6*c*. That is, the light-emitting drive unit 4013 outputs, under low-level control of the fourth control signal S4 in the period of time t6 of the hold frame, the first drive power supply voltage ELVDD to the light-emitting device 402. The specific implementation principle and process of outputting the first drive power supply voltage ELVDD to the light-emitting device 402 by the light-emitting drive unit 4013 in the period of time t6 of the hold frame are consistent with the specific implementation principle and process of outputting the first drive power supply voltage ELVDD to the light-emitting device 402 in the period of time t3 of the write frame mentioned in FIG. 6*c*, and details are not described herein again.

In some embodiments, the display apparatus 400 may be compatible with a same set of gamma in a high/low-frequency driving mode, instead of using different gamma in different modes, thereby reducing costs. Specifically, when a signal time sequence change of the first control signal S1, the second control signal S2, and the third control signal S3 in the write frame of the display apparatus 400 in a low-frequency driving mode is consistent with that in a high-frequency driving mode, and in the low-frequency driving mode, level time sequence changes of the fourth control signal S4, the fifth control signal S5, and the sixth control signal S6 in the write frame and the hold frame are consistent, the display apparatus 400 may be compatible with the same set of gamma in the high/low-frequency driving mode. As the signal time sequence change of the first control signal S1, the second control signal S2, and the third control signal S3 in the write frame of the display apparatus 400 in the low-frequency driving mode is consistent with that in the high-frequency driving mode, charging and discharging times of the capacitor C in the display apparatus 400 are the same no matter in the low-frequency driving mode or in the high-frequency driving mode. In addition, as in the low-frequency driving mode, the level time sequence changes of the fourth control signal S4, the fifth control signal S5, and the sixth control signal S6 in the write frame and the hold frame are consistent, and in the high-frequency driving mode, a level time sequence change of the fourth control signal S4, the fifth control signal S5, and the sixth control signal S6 in each frame is consistent with that in the write frame in the low-frequency driving mode, that is, whether in the low-frequency driving mode or in the high-frequency driving mode, the level time sequence change of the fourth control signal S4, the fifth control signal S5, and the sixth control signal S6 in each frame is consistent, the voltage applied to the light-emitting device 402 remains unchanged in both the low-frequency driving mode and the high-frequency driving mode. Therefore, the same set of gamma can be compatible, where gamma is a term used to describe a "non-linear" degree of the brightness of the display apparatus. For example, the display apparatus 400 of 10 HZ/120 HZ uses gamma of 2.2 in both the low-frequency (10 HZ) driving mode and the high-frequency (120 HZ) driving mode. The display apparatus 400 of 10 HZ/120 HZ indicates that the screen refresh rate of the display apparatus 400 is 120 HZ, the data voltage data is written to the control end of the drive thin-film transistor T0 10 times per second in the low-frequency driving mode, and the data voltage data is written to the control end of the drive thin-film transistor T0 120 times per second in the high-frequency mode.

Figure 7:
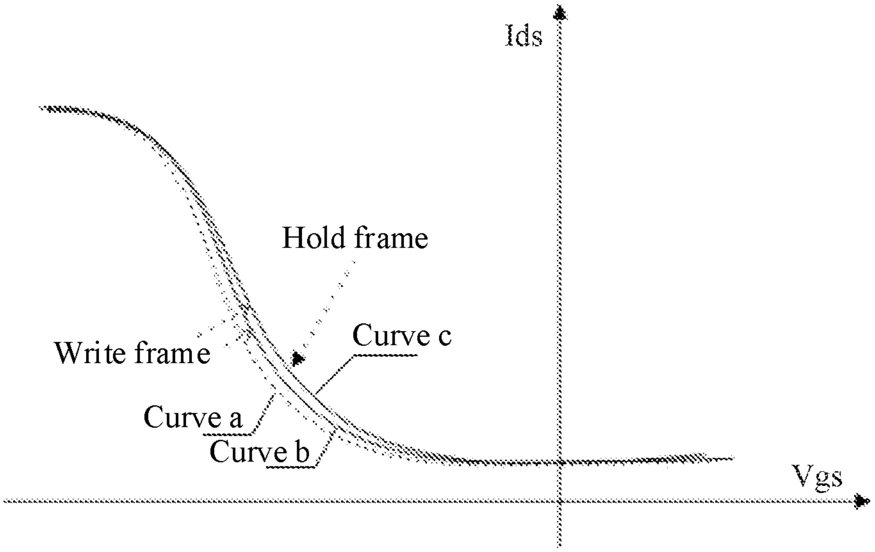
FIG. 7 is a schematic graph showing a change of the influence of an adjustment unit 4011 on a transfer characteristic curve of a drive thin-film transistor T0 according to an embodiment of this application.
Figure 8:
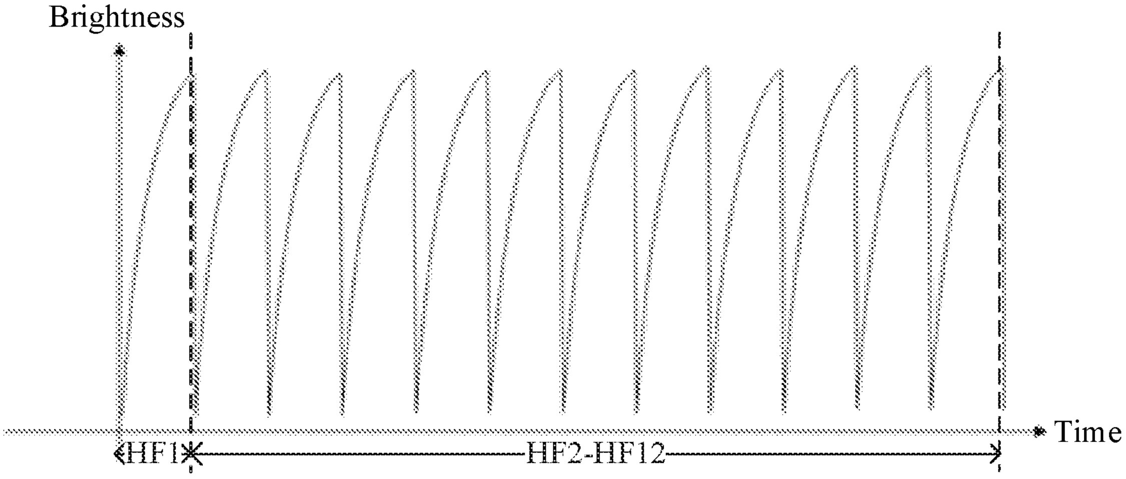
FIG. 8 is a graph showing a change relationship between a brightness of a light-emitting device 403 and time according to an embodiment of this application.

As the adjustment unit 4011 connected to the light-emitting drive unit 4013 outputs, in the write frame under the control of the first control signal S1, the adjustment voltage vref to the control-end back channel of the drive thin-film transistor T0 in the light-emitting drive unit 4013, to reduce the influence of negative bias of the threshold voltage of the drive thin-film transistor T0 caused by the negative voltage of the first reset voltage vinit1, the transfer characteristic curve of the drive thin-film transistor T0 shifts forward in the write frame, that is, the threshold voltage shifts forward, making it easier for the drive thin-film transistor T0 to turn on in the write frame. Specifically, referring to FIG. 7, FIG. 7 is a schematic graph showing a change of the influence of the adjustment unit 4011 on the transfer characteristic curve of the drive thin-film transistor T0 according to an embodiment of this application. When the adjustment voltage vref is not inputted to the control-end back channel of the drive thin-film transistor T0 through the adjustment unit 4011 in the write frame, the transfer characteristic curve of the drive thin-film transistor T0 in the write frame is shown as a curve a in FIG. 7 (namely, the dotted curve in FIG. 7). It can be seen that the curve a is negatively biased relative to a curve C in the hold frame. When the adjustment voltage vref is inputted to the control-end back channel of the drive thin-film transistor T0 through the adjustment unit 4011 in the write frame, the transfer characteristic curve of the drive thin-film transistor T0 is shown as a curve b in FIG. 7. It can be seen that the curve b shifts forward relative to the curve a and is closer to the curve c. Therefore, after the adjustment unit 4011 works, the brightness of the drive thin-film transistor T0 in the write frame is increased. As a result, the light-emitting drive unit 4013 controls the light-emitting brightness of the light-emitting device 402 in the write frame and the hold frame to avoid deviation, thereby preventing flickering. As shown in FIG. 8, FIG. 8 is a schematic graph showing a brightness change of the light-emitting device in the write frame and the hold frame according to an embodiment of this application. It can be seen from FIG. 8 that a brightness of the light-emitting device in a period of time HF1 in a first frame is almost the same as a brightness of the light-emitting device in a period of time HF2 in a second frame to a period of time HF12 in a twelfth frame. HF1 is the period of time in the write frame, and HF2 to HF12 are the periods of time in the hold frames. The light-emitting device no longer flickers.

Through the description of the foregoing implementations, a person skilled in the art may clearly understand that, for the purpose of convenient and brief description, only division of the foregoing functional modules is used as an example for description. In a practical application, the functions may be allocated to and completed by different functional modules according to requirements. That is, an internal structure of the apparatus is divided into different functional modules, to complete all or some of the functions described above. For specific working processes of the system, the apparatus, and the unit described above, refer to the corresponding processes in the foregoing method embodiments. Details are not described herein again.

In the several embodiments provided in this application, it should be understood that the disclosed apparatus may be implemented in other manners. For example, the described apparatus embodiments are merely examples. For example, the module or unit division is merely logical function division and may be other division during actual implementation. For example, a plurality of units or components may be combined or integrated into another system, or some features may be omitted or not performed. In addition, the shown or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and the components displayed as units may or may not be physical units, may be located in one position, or may be distributed on a plurality of network units. Some or all of the units may be selected according to an actual requirement to achieve the objectives of the solutions in the embodiments.

In addition, the functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments essentially, or the part contributing to the related art, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in the embodiments. The storage medium includes: any medium that can store program code, such as a flash memory, a removable hard disk, a read-only memory, a random access memory, a magnetic disk, or a compact disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A display control apparatus, comprising a first reset unit configured to output a first reset voltage, a write unit configured to output a data voltage, and a light-emitting drive unit connecting the first reset unit and the write unit, wherein the light-emitting drive unit is configured to output a first drive power supply voltage to a light-emitting device through the first reset voltage, an adjustment voltage, and the data voltage; and the display control apparatus further comprising an adjustment unit, wherein the adjustment unit is connected to the light-emitting drive unit, and outputs the adjustment voltage in a write frame to a control-end back channel of a drive thin-film transistor in the light-emitting drive unit; and the adjustment voltage is a positive voltage, the first reset voltage is a negative voltage, and the adjustment voltage is configured to reduce a negative bias caused by the first reset voltage during the write frame.

2. The display control apparatus according to claim 1, wherein the adjustment unit comprises:

a first transistor, wherein a control end of the first transistor receives a first control signal, an input end of the first transistor receives the adjustment voltage, an output end of the first transistor is connected to the control-end back channel of the drive thin-film transistor in the light-emitting drive unit, and the first control signal controls the first transistor to be turned on in the write frame.

3. The display control apparatus according to claim 1, wherein a value of the adjustment voltage is set based on a target gray scale.

4. The display control apparatus according to claim 1, wherein in the case of outputting a reset voltage, the first reset unit is configured to:

output the first reset voltage in the write frame to a control end of the drive thin-film transistor.

5. The display control apparatus according to claim 1, wherein in the case of outputting the first drive power supply voltage to the light-emitting device through the first reset voltage, the adjustment voltage, and the data voltage, the light-emitting drive unit is configured to:

in the write frame, reset the drive thin-film transistor through the first reset voltage received, increase a threshold voltage of the drive thin-film transistor through the adjustment voltage received, write the data voltage received to a control end of the drive thin-film transistor, and compensate the threshold voltage of the drive thin-film transistor to the control end of the drive thin-film transistor, so as to output the first drive power supply voltage to the light-emitting device; and in a hold frame, maintain an electric potential of the control end of the drive thin-film transistor at a fixed voltage value through the data voltage received by an input end of the drive thin-film transistor, so as to output the first drive power supply voltage to the light-emitting device, wherein the fixed voltage value is a sum of the threshold voltage of the drive thin-film transistor and the data voltage.

6. The display control apparatus according to claim 1, wherein in the case of outputting the data voltage, the write unit is configured to:

output the data voltage according to a first preset frequency in the write frame and a hold frame.

7. The display control apparatus according to claim 1, further comprising:

a second reset unit, configured to output a second reset voltage to the light-emitting device according to a second preset frequency in a non-light-emitting period of time of the light-emitting device in the write frame and a hold frame, so as to reset the light-emitting device.

8. The display control apparatus according to claim 7, wherein the second reset unit comprises:

a seventh transistor, wherein a control end of the seventh transistor receives a sixth control signal, an input end of the seventh transistor receives the second reset voltage, an output end of the seventh transistor outputs the second reset voltage, and the sixth control signal controls the seventh transistor to be turned on according to the second preset frequency in the non-light-emitting period of time of the light-emitting device in the write frame and the hold frame.

9. The display control apparatus according to claim 1, wherein the first reset unit comprises:

a second transistor, wherein a control end of the second transistor receives a second control signal, an input end of the second transistor receives the first reset voltage, an output end of the second transistor is connected to a control end of the drive thin-film transistor in the light-emitting drive unit, and the second control signal controls the second transistor to be turned on in the write frame.

10. The display control apparatus according to claim 1, wherein the light-emitting drive unit comprises:

a third transistor, a fourth transistor, a fifth transistor, a capacitor, and the drive thin-film transistor;

a control end of the third transistor receives a third control signal, an input end of the third transistor is connected to an output end of the drive thin-film transistor, and an output end of the third transistor is connected to a control end of the drive thin-film transistor; the third control signal controls the third transistor to be turned on in the write frame;

a control end of the fourth transistor receives a fourth control signal, an input end of the fourth transistor receives the first drive power supply voltage, and an output end of the fourth transistor is connected to an input end of the drive thin-film transistor; the input end of the drive thin-film transistor further receives the data voltage outputted by the write unit;

a control end of the fifth transistor receives the fourth control signal, an input end of the fifth transistor is connected to the output end of the drive thin-film transistor, and an output end of the fifth transistor is connected to the light-emitting device; the output end of the fifth transistor outputs the first drive power supply voltage in a case that the fifth transistor is turned on; the fourth control signal controls the fourth transistor and the fifth transistor to be turned on in a light-emitting period of time of the light-emitting device in the write frame and a hold frame; and one end of the capacitor is connected to the control end of the drive thin-film transistor, and the other end of the capacitor is connected to the input end of the fourth transistor.

11. The display control apparatus according to claim 1, wherein the write unit comprises:

a sixth transistor, wherein a control end of the sixth transistor receives a fifth control signal, an input end of the sixth transistor receives the data voltage, the sixth transistor outputs the data voltage, and the fifth control signal controls the sixth transistor to be turned on according to a first preset frequency in the write frame and a hold frame.

12. A display apparatus, comprising the display control apparatus according to claim 1 and a light-emitting device connected to the display control apparatus, wherein the light-emitting device is configured to emit light when that the first drive power supply voltage is received.

13. The display apparatus according to claim 12, further comprising: a control chip, connected to the display control apparatus and the light-emitting device respectively, and configured to generate a first reset voltage, the first drive power supply voltage, a first control signal, and an adjustment voltage.

14. The display apparatus according to claim 12, wherein the light-emitting device is a light-emitting diode; and a cathode of the light-emitting diode receives a second drive power supply voltage, and an anode of the light-emitting diode receives the first drive power supply voltage.

15. An electronic device, comprising: a display screen, provided with the display apparatus according to claim 12.

16. The electronic device according to claim 15, wherein a first preset frequency is consistent with a screen refresh rate of the display screen.

17. The electronic device according to claim 15, wherein a first preset frequency is consistent with a screen refresh rate of the display screen.

* * * * *